US012649169B2

(12) United States Patent
Contreras et al.

(10) Patent No.: US 12,649,169 B2
(45) Date of Patent: Jun. 9, 2026

(54) ANTIFOULING COATINGS AND METHODS FOR COATING SUBSTRATES

(71) Applicant: InnoTech Alberta Inc., Edmonton (CA)

(72) Inventors: Pablo Contreras, Calgary (CA); Shad W. Siddiqui, Edmonton (CA); Kai Man Lee, Edmonton (CA); Juan Segura, Edmonton (CA)

(73) Assignee: InnoTech Alberta Inc., Edmonton (CA)

( * ) Notice: Subject to any disclaimer, the term of this patent is extended or adjusted under 35 U.S.C. 154(b) by 287 days.

(21) Appl. No.: 18/444,093

(22) Filed: Feb. 16, 2024

(65) Prior Publication Data

US 2024/0286169 A1 Aug. 29, 2024

Related U.S. Application Data

(60) Provisional application No. 63/485,634, filed on Feb. 17, 2023.

(51) Int. Cl.

*B05D 1/38* (2006.01)
*C09D 5/16* (2006.01)
*C09D 183/06* (2006.01)

(52) U.S. Cl.

CPC ............ *B05D 1/38* (2013.01); *C09D 5/1675* (2013.01); *C09D 5/1693* (2013.01); *C09D 183/06* (2013.01)

(58) Field of Classification Search

CPC ...... B05D 1/38; C09D 5/1675; C09D 5/1693; C09D 183/06

See application file for complete search history.

(56) References Cited

U.S. PATENT DOCUMENTS 5,779,881 A 7/1998 Tong et al.
10,947,396 B2 * 3/2021 Qiu .................... C09D 133/16
(Continued)

FOREIGN PATENT DOCUMENTS

CN 110819170 2/2020
CN 114316796 4/2022
(Continued)

OTHER PUBLICATIONS

Hoque et al., "Alkylphosphonate Modified Aluminum Oxide Surfaces," J. Phys. Chem. B (2006), 110, 22, 10855-10861.

*Primary Examiner* — Nathan T Leong
(74) *Attorney, Agent, or Firm* — CHRISTENSEN O'CONNOR JOHNSON KINDNESS PLLC

(57) ABSTRACT

Coatings for reducing or preventing fouling of surfaces are provided. In some embodiments, the coating comprises a silane compound, a siloxane compound, a phosphonate compound, a silicone polymer such as PDMS (polydimethylsiloxane), or a combination of silane-siloxane-phosphonate-PDMS in various molecular configurations in single monolayer and overlay assemblies. Also provided are related methods for forming the coating as well as coated substrates such as heat exchangers. Embodiments of the coatings are highly hydrophobic with high contact angles and the coated substrates may be used in a variety of industrial applications that require handling of oil-in-water emulsions, process water and produced water from various process operations, including Steam Assisted Gravity Drainage (SAGD) operations.

17 Claims, 15 Drawing Sheets

(56) References Cited

U.S. PATENT DOCUMENTS

| | | | | |
|---|---|---|---|---|
| 11,305,235 | B2 | 4/2022 | Grinham et al. | |
| 11,392,146 | B2 | 7/2022 | Wei et al. | |
| 11,441,852 | B2 | 9/2022 | Brockway et al. | |
| 2002/0098293 | A1* | 7/2002 | Kokoschke | B05C 1/0813 427/428.21 |
| 2012/0219801 | A1 | 8/2012 | Huang | |
| 2013/0089670 | A1 | 4/2013 | Su et al. | |
| 2014/0311718 | A1* | 10/2014 | Nilsson | F28F 19/02 165/133 |

FOREIGN PATENT DOCUMENTS

| | | |
|---|---|---|
| DE | 102005046704 | 3/2006 |
| JP | 2010070735 | 4/2010 |
| WO | WO 2016160766 | 10/2016 |

* cited by examiner

406

402

404

ANTIFOULING COATINGS AND METHODS FOR COATING SUBSTRATES

RELATED APPLICATION

The present disclosure claims priority to U.S. Provisional Patent Application No. 63/485,634, filed Feb. 17, 2023, the entire content of which is herein incorporated by reference.

TECHNICAL FIELD

The present disclosure relates to coatings. More particularly, the present disclosure relates to antifouling coatings and methods for coating substrates.

BACKGROUND

Fouling is a common issue in a wide range of equipment, including heat exchangers. Heat exchanger fouling is a particular challenge in the oil industry, in which heat exchangers are used during surface operations and refining operations to heat up or cool down both oil and water. For example, in Steam Assisted Gravity Drainage (SAGD) operations, large amounts of steam are injected into an underground reservoir via an injection well and produced fluid comprising mobilized bitumen and water (condensed steam and formation water) is received into a production well. The produced fluid, which is in the form of oil and water emulsion, is pumped to a central processing facility to separate the water from the oil and further treat the water for re-use or disposal, and the oil for the gate pass over. Due to the high temperature of the produced SAGD water (typically 120 to 180° C.), the water is generally cooled before it is treated. For example, cooling of the water is typically achieved using heat exchangers such as shell-and-tube heat exchangers. Such water may contain free and dissolved oil, dissolved solids (silica and salts), clay and minerals, all of which contribute to the formation of unwanted foulants or deposits in heat exchangers. These deposits reduce heat transfer capabilities and generate high pressure drops during operation. Fouled heat exchangers can be cleaned or repaired but such cleaning or repair can be costly and lead to significant downtime.

Similar fouling issues are also encountered in other oil production facilities that use heat exchangers to heat the produced fluids prior to treatment, including Enhanced Oil Recovery (EOR) operations and refineries. In EOR operations in which a polymer solution is injected into the reservoir, the produced fluid is typically heated using parallel plate heat exchangers. The combination of hydrocarbons, polymer, and other contaminants in the produced fluid can lead to fouling of the heat exchanger plates.

Wastewater and oil streams from industrial operations are often cooled off to recover residual heat before being recycled, processed, or released. Foulants (like oil and grease) found in the wastewater of a wide range of industries including oil production, oil refining, mining, aviation, manufacturing, pharmaceutical manufacture, pulp and paper, food, beverage, textile, leather, coal gasification and more, may cause fouling of heat exchanger surfaces (tubes, plates, or other heat exchanger surface configurations).

A variety of coatings and surface treatments have been proposed for reducing fouling in heat exchangers. However, conventional coatings do not prevent the deposition of organic matter from produced fluid in oil recovery operations. In addition, these conventional coatings may tend to deteriorate due to the high temperatures and high contaminant content of produced water. Moreover, conventional coating processes may lead to uneven coatings prone to pealing. Some coating processes, such as vapor deposition, also require expensive equipment and high temperature reactions and may not be suitable for all types of heat exchangers.

SUMMARY

In one aspect, there is provided a method for forming a coating on a surface of a substrate, comprising: cleaning the surface of the substrate; providing a coating composition comprising at least one surface modifying compound, the at least one surface modifying compound comprising an alkyl silane, a siloxane, an alkyl-phosphonic acid, or a combination thereof; contacting the surface of the substrate with the coating composition such that at least a portion of the surface modifying compound is grafted to the surface to form a coated surface; heat treating the coated surface at a first temperature for a first time period; heat treating the coated surface at a second temperature for a second time period, the second temperature being higher than the first temperature; heat treating the coated surface at a third temperature for a third time period, the third temperature being higher than the second temperature; and repeating the contacting and heat treating steps at least one additional time.

In some embodiments, the surface modifying compound comprises the siloxane and wherein the siloxane has formula (I):

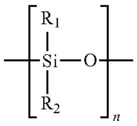

wherein $R_1$ is an alkyl group, $R_2$ is hydrogen (—H), hydroxyl (—OH), an alkoxy group (O-alkyl), or another reactive group, and n is the degree of polymerization; and wherein $R_1$ is optionally partially or fully fluorinated or partially or fully hydrogenated.

In some embodiments, the surface modifying compound comprises the alkyl-phosphonic acid and wherein the alkyl-phosphonic acid has formula (III):

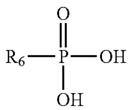

wherein $R_6$ is an alkyl group; and wherein $R_6$ is optionally partially or fully fluorinated or partially or fully hydrogenated.

In some embodiments, the surface modifying compound comprises the alkyl silane and the alkyl silane has formula (II):

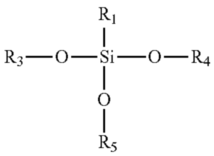

wherein $R_1$ is an alkyl group and each of $R_3$, $R_4$, and $R_5$ are independently selected from —H and an alkyl group; and wherein $R_1$ is optionally partially or fully fluorinated or partially or fully hydrogenated.

In some embodiments, the surface modifying compound comprises the alkyl-phosphonic acid, and wherein the method further comprises: providing a silicone coating composition comprising a polydimethylsiloxane (PDMS) base polymer and a cross-linking compound; contacting the coated surface with the silicone coating composition to form a silicone-coated surface; and heat treating the silicone-coated surface at between about 60° C. and about 100° C. for between about 12 hours and about 20 hours, followed by a second heat treatment at between about 100° C. and about 140° C. for 30 minutes and 4 hours.

In some embodiments, the PDMS base polymer has formula (VI):

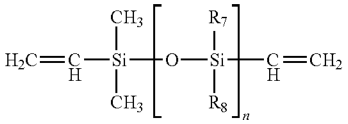

wherein $R_7$ and $R_8$ are independently selected alkyl groups and n is the degree of polymerization; and wherein the cross-linking compound has formula (VII):

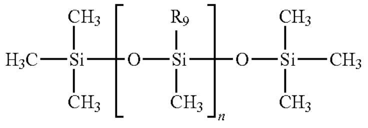

wherein $R_9$ is an alkyl group partially substituted with —H and n is the degree of polymerization; wherein $R_7$, $R_8$, and $R_9$ are optionally partially or fully fluorinated or partially or fully hydrogenated.

In some embodiments, the method further comprising contacting the silicone-coated surface with another coating composition comprising alkyl-phosphonic acid followed by heat treating at the first temperature for the first time period, the second temperature for the second time period, and the third temperature for the third time period.

In some embodiments, the first temperature is between about 40° C. and about 100° C. and the first time period is between about 30 minutes and 2 hours; the second temperature is between about 100° C. and about 160° C. and the second time period is between about 1 hour and 3 hours; and the third temperature is between about 110° C. and about 180° C. and the third time period is between about 30 minutes and 2 hours.

In some embodiments, the substrate is at least a portion of a heat exchanger and the surface is a heat exchange surface.

In some embodiments, the cleaning, contacting, and heat treating steps are each performed in situ.

In some embodiments, at least one of the heat treating steps comprises contacting the coated surface with a heated inert gas or vapor within the heat exchanger, or passing a heated inert gas, vapor, or liquid through the heat exchanger on an opposite side of the coated surface.

In some embodiments, the cleaning step comprises: contacting the surface with a first organic solvent; contacting the surface with a second organic solvent; contacting the surface with a diluted organic solvent in water; and contacting the surface with pure water.

In another aspect, there is provided a method for forming a coating on at least one heat exchange surface of a heat exchanger, comprising: cleaning the heat exchange surface by passing at least one cleaning fluid through the heat exchanger; providing a coating composition comprising at least one surface modifying compound, the at least one surface modifying compound comprising a silane, a siloxane, an alkyl-phosphonic acid, or a combination thereof; introducing the coating composition into the heat exchanger such that the coating composition contacts the at least one heat exchange surface to form a coated surface; and heat treating the coated surface by passing a heating medium through the heat exchanger.

In some embodiments, the heating medium is a heated inert gas or vapor and wherein the heating medium directly contacts the coated surface.

In some embodiments, the heating medium is a heated liquid, gas, or vapor and wherein the heating medium indirectly heats the coated surface by passing through the opposite side of the coated surface.

In some embodiments, heat treating the coated surface comprises: passing the heating medium through the heat exchanger at a first temperature for a first time period; passing the heating medium through the heat exchanger at a second temperature for a second time period, the second temperature being higher than the first temperature; and passing the heating medium through the heat exchanger at a third temperature for a third time period, the third temperature being higher than the second temperature.

In some embodiments, the method further comprises introducing a silicone coating composition into the heat exchanger to contact the coated surface and form a silicone-coated surface, followed by heat treating the silicone-coated surface.

In another aspect, there is provided a heat exchanger comprising: a heat exchange surface; and a coating formed by the method of claim 1 or claim 12, the coating comprising a siloxane of formula (IV), a phosphonate of formula (V), or a combination thereof, grafted to the heat exchange surface.

In some embodiments, the coating further comprises a PDMS overlay layer.

In some embodiments, the coating comprises at least one multimolecular configuration selected from siloxane-phosphonate, phosphonate-siloxane, siloxane-phosphonate-siloxane, and phosphonate-siloxane-phosphonate, in single or multilayer configurations.

Other aspects and features of the present disclosure will become apparent, to those ordinarily skilled in the art, upon review of the following description of specific embodiments of the disclosure.

BRIEF DESCRIPTION OF THE DRAWINGS

Some aspects of the disclosure will now be described in greater detail with reference to the accompanying drawings. In the drawings.

DETAILED DESCRIPTION

Generally, the present disclosure provides a coating for reducing or preventing fouling of surfaces. In some embodiments, the coating comprises silane/siloxane groups, phosphonate groups, or a combination thereof grafted to the surface of a substrate. In some embodiments, the coating further comprises a silicone polymer such as polydimethylsiloxane (PDMS). Also provided are related methods for forming the coating as well as coated substrates such as heat exchangers.

As used herein the terms "a", "an", and "the" may include plural referents unless the context clearly dictates otherwise.

As used herein, "fouling" refers to deposition of organic and/or inorganic matter on a surface of a substrate. As used herein, "substrate" refers to any object, article, or material, or any portion thereof that can be coated with a coating. As used herein, "coating" refers to any modification material applied to the surface of the substrate to create a layer of the surface modification material, ranging from a molecular monolayer to a film in micrometer thickness. The term "coating" may thereby be used interchangeably with the terms "film" or "filming" when referring to such micrometer thickness films. In some embodiments, the "coating" is a chemical surface modification such as grafting. The terms "grafting" and "molecular deposition" are used interchangeably herein to refer to joining or uniting at least one molecule of the coating with at least one molecule of the substrate, for example, by chemisorption or physisorption. The coating may function to reduce the surface energy of the substrate, thereby decreasing the wettability of the surface and increasing the contact angle, as discussed in more detail below.

Figure 1:
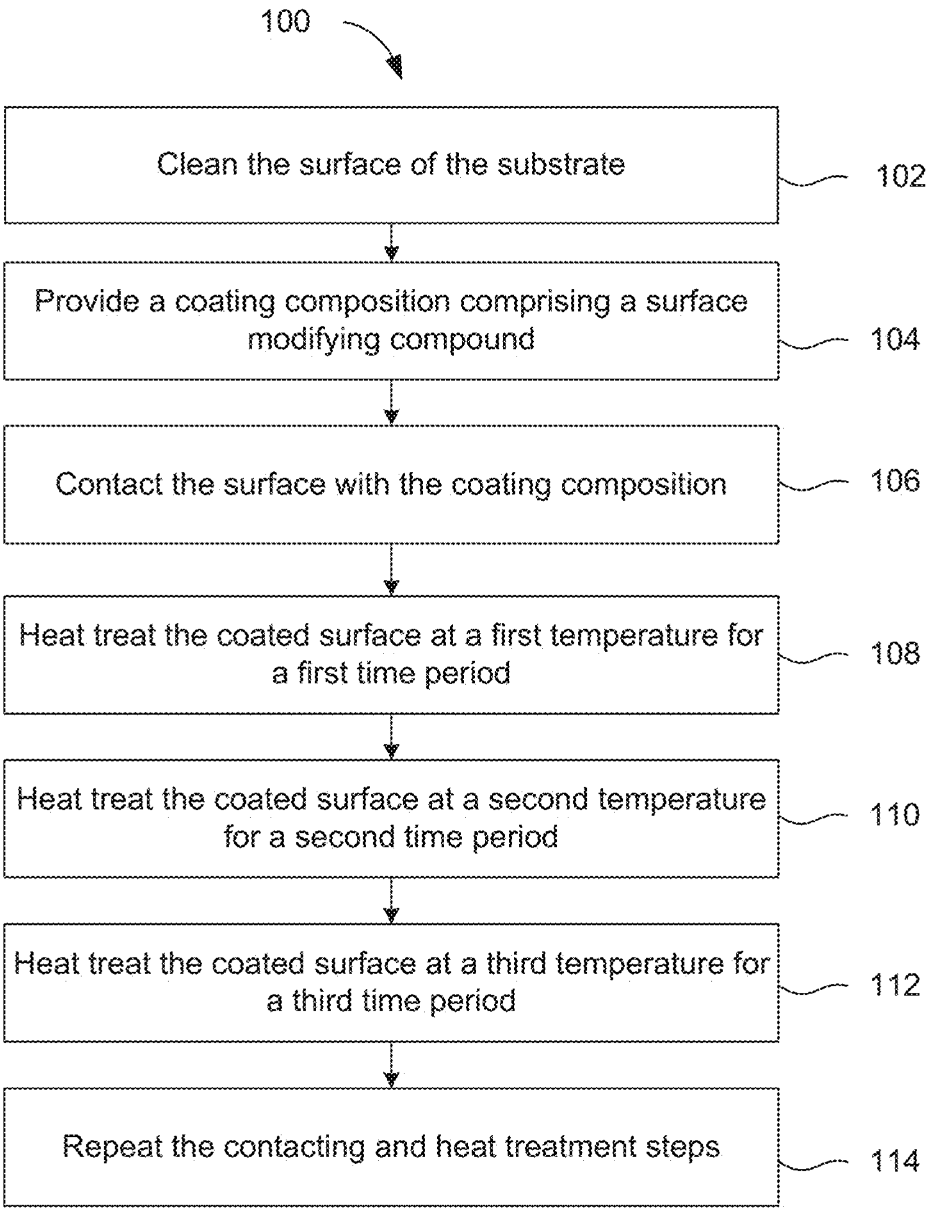
FIG. 1 is a flowchart of an example method for forming a coating, according to some embodiments.

FIG. 1 is a flowchart of an example method 100 for forming a coating on a surface of a substrate, according to some embodiments.

In some embodiments, the substrate is comprised of metal. Non-limiting examples of metal substrates include titanium, aluminum, copper, stainless steel, carbon steel and any suitable alloy of variable composition thereof. In some embodiments, the substrate may be a material that forms surface-bound hydroxy (—OH) groups in air. In other embodiments, surface oxide and hydroxide groups may be formed on the substrate via a heat treatment step as discussed below. Alternatively, the surface may be washed with a weak sodium hydroxide (NaOH) solution followed by drying the washed surface in an oven. In other embodiments, the substrate is any other suitable substrate.

The "surface" may be the entire surface of the substrate or any portion thereof (e.g. one side of the substrate). In some embodiments, the substrate is one or more plates or tubes of a heat exchanger.

At block 102, the surface of the substrate is cleaned. The surface may be cleaned by contacting the surface with at least one cleaning fluid. In some embodiments, the substrate may be immersed in the cleaning fluid, such as in the system 600 discussed below. In other embodiments, the cleaning fluid may be flowed over the surface, such as in the system 610 discussed below. In other embodiments, the surface may be contacted with the cleaning fluid by any other suitable means.

The cleaning fluid may be water, solvent, or a combination thereof. The solvent may be an organic solvent such as methanol, ethanol, isopropyl alcohol, Varsol™, or combinations thereof. In some embodiments, the surface may be cleaned by a multi-stage cleaning process in which the surface first undergoes one or more cleaning steps with organic solvent(s) followed by one or more cleaning steps with water. For example, the surface may be cleaned with a first organic solvent (e.g. isopropyl alcohol or Varsol™), followed by cleaning with a second organic solvent (e.g. methanol or ethanol), followed by cleaning with an organic solvent diluted in water (e.g. diluted methanol or ethanol), and finally cleaning with pure water. It will be understood that "pure" water in this context is intended to refer to water alone, without any other solvent, although other minor impurities may be present. This multi-stage cleaning technique may help to condition the surface of the substrate and remove organic impurities, without leaving residual solvent that could interfere with the coating steps discussed below. In some embodiments, after drying, the surface may be treated with ozone. For example, a UV (ultraviolet) ozone cleaner may be used to clean the surface of the substrate with the ozone from the air irradiated by UV light, which breaks down surface contaminants.

In some embodiments, the cleaning step(s) are performed in situ. The term "in situ" in this context refers to the substrate being within an assembly or apparatus in which it is normally used. For example, where the substrate comprises one or more plates or tubes of a heat exchanger, the cleaning fluid may be passed through the heat exchanger itself with the plates/tubes in place.

Alternatively, or additionally, the surface of the substrate may be cleaned via a physical cleaning process such as abrasive blasting. In these embodiments, the plates/tubes of a heat exchanger may be removed for the cleaning step.

In some embodiments, the surface is then dried. The surface may be dried in air at room temperature or by application of heat. In some embodiments, the surface is dried by application of steam.

In some embodiments, the surface of the substrate is heat treated prior to the steps at block 106. The term "heat treat" as used herein is intended to be inclusive of heating by any technique. In some embodiments, the surface can be heat treated by placing the substrate in a heating apparatus, such as an oven, and raising the temperature within the apparatus. In other embodiments, the surface may be heat treated using a device that directs a heating medium towards the surface. The heating medium may be steam, hot air, hot nitrogen, or any other heated non-reactive gas or vapor. In embodiments in which the heating medium is steam, the steam can be of varying quality including steam that is superheated, saturated, or neither superheated nor saturated. In all embodiments, the heat should be approximately uniformly distributed across the surface. The surface may be heat treated at a suitable temperature for a suitable period of time. In some embodiments, the temperature is between about 200° C. and 350° C., or between about 250° C. and 300° C., or approximately 275° C. The period of time may be between 1 and 20 hours, or about 15 hours. The heat treatment step may help to create surface oxide and hydroxide groups to provide anchoring sites for grafting to create a stronger coating layer.

In some embodiments, the surface of the substrate may otherwise be untreated. As used herein, "untreated" means that the surface has not been subjected to any mechanical and/or chemical pre-treatment (with the exception of surface cleaning and/or heat treating) prior to the coating step at block 106. For example, the surface may not be subjected to an oxidation, roughening, and/or passivation treatment. In other words, the surface may be non-oxidized, non-roughened, and non-passivated. In other embodiments, the surface may be subjected to one or more of the above pre-treatments.

At block 104, a coating composition comprising a surface modifying compound is provided. The term "providing" in this context refers to making, manufacturing, acquiring, purchasing, or otherwise obtaining a component or material disclosed herein. As used herein, "coating composition" refers to a composition capable of producing a coating and is inclusive of solutions, mixtures, and dispersions. As used herein, "surface modifying compound" refers to any chemical compound that can be grafted or otherwise attached to a surface of a substrate by a physical or chemical reaction.

In some embodiments, the surface modifying compound comprises a siloxane. The terms "siloxane" and "polysiloxane" are used interchangeably herein to refer to molecules with repeating units of Si—O—Si. The siloxane may have formula (I):

(I)

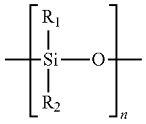

where $R_1$ is a hydrophobic group, $R_2$ is hydrogen (—H), hydroxyl (—OH), an alkoxy group (O-alkyl), or another reactive group, and n is the degree of polymerization. The degree of polymerization (n) may be at least 1, at least 5, or at least 10. In some embodiments, n is between 10 and 60, or greater.

In some embodiments, $R_1$ is an alkyl group. The term "alkyl", as used herein, is intended to be inclusive of straight chain (linear), branched, and cyclic hydrocarbons. The alkyl group may have one or more carbon atoms, or between 1 and 20 carbon atoms (i.e. C1-C20). The alkyl group may be partially or fully hydrogenated. The alkyl group can also be partially or fully fluorinated. A partially or fully fluorinated alkyl group may also be referred to as a "fluoroalkyl" group. As used herein, "fluoroalkyl" refers to an alkyl group in which one or more hydrogens are replaced by fluorine. A fully fluorinated alkyl group is also referred as a "perfluoroalkyl" group.

In some specific embodiments, $R_1$ is —$CH_3$ (methyl), —$C_2H_5$ (ethyl), or $C_3H_8$ (propyl), or phenyl. As one non-limiting example, the polysiloxane may be methyl hydrogen polysiloxane ("MHPS"; also referred to as polymethylhydrosiloxane or "PMHS"), with a chemical formula of $(CH_3(H)SiO)_n$), in which $R_1$=—$CH_3$ and $R_2$=—H.

In other embodiments, the surface modifying compound comprises an alkyl silane. The alkyl silane may have formula (II):

(II)

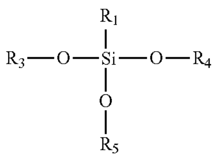

where $R_1$ is a hydrophobic group and each of $R_3$, $R_4$, and $R_5$ are independently selected from —H and an alkyl group. $R_1$ may be any of the hydrophobic groups as discussed above for $R_1$ of formula (I), including partially or fully fluorinated groups (fluoroalkyls) or partially or fully hydrogenated alkyl groups. In some embodiments, $R_3$, $R_4$, and $R_5$ are all the same group. For example, $R_3$, $R_4$, and $R_5$ may each be methyl groups and the silane may have the formula $(R_1(OCH_3)_3Si)$. In other embodiments, $R_3$, $R_4$, and $R_5$ may be different groups.

In these embodiments, the alkyl silane acts as a precursor to a polysiloxane. The silane may undergo hydrolysis and condensation reactions in order to form the polysiloxane that is bonded to the surface of the substrate. The resulting polysiloxane may have a degree of polymerization (n) of at least 1, at least 5, or at least 10. In some embodiments, n is between 10 and 60, or greater.

In other embodiments, the surface modifying compound may be comprise a base siloxane molecular and a cross-linker similar to those discussed below with respect to the method 300 of FIG. 3.

In some embodiments, the coating composition is a liquid solution and further comprises a solvent. The solvent may be any suitable solvent with which the siloxane or alkyl silane is soluble. In some embodiments, the solvent is an organic solvent. In some embodiments, the organic solvent is an alcohol. As one example, the solvent may comprise ethanol. In other embodiments, the solvent may comprise acetone, tetrahydrofuran (THF), ether, or any other suitable solvent. In yet other embodiments, the solvent may be a combination of two or more of the solvents discussed above. In embodiments in which the surface-modifying compound is a silane, the solvent may at least partially comprise water to facilitate the hydrolysis reaction for polymerization, for example, a mixture of water and ethanol.

In some embodiments, the concentration of the siloxane or silane in the solution may be at least about 1%, at least about 5%, or at least about 10%. In some embodiments, the concentration of the siloxane or silane in the solution is about 20% or less, about 15% or less, or about 10% or less. The concentration of the siloxane or silane in the solution may be between about 1% and about 20% (v/v), between about 5% and about 15% (v/v), or approximately 10% (v/v).

In other embodiments, the surface modifying compound comprises an alkyl-phosphonic acid. The alkyl-phosphonic acid may have formula (III):

(III)

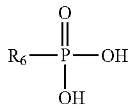

where $R_6$ is a hydrophobic group.

In some embodiments, $R_6$ is an alkyl group. In some embodiments, $R_6$ is an alkyl group between one and 22 carbon atoms (i.e., C1 to C22). For example, $R_6$ can be methyl, ethyl, butyl, decyl, dodecyl, hexadecyl, octadecyl, phenyl, tolyl, xylyl, naphthyl, or any other suitable alkyl group. The alkyl group may be partially or fully hydrogenated. In other embodiments, $R_6$ can be a partially or fully fluorinated alkyl group. In some embodiments, the alkyl-phosphonic acid is octadecylphosphonic acid ("ODPA", having formula $C_{18}H_{39}O_3P$ or $CH_3(CH_2)_{16}CH_2P(O)(OH)_2$), in which $R_6$ is an octadecyl group, i.e. a C18 alkyl group.

In these embodiments, the solvent may be any suitable solvent with which the alkyl-phosphonic acid is soluble. In some embodiments, the solvent is an organic solvent. In some embodiments, the organic solvent is anisole or tetrahydrofuran (THF). In other embodiments, the solvent may comprise triethylamine, ethyl ether, tetrahydrofuran (THF), pyridine, acetone, methanol, acetonitrile, DMSO or any other suitable solvent. In yet other embodiments, the solvent may be a combination of two or more suitable solvents.

In some embodiments, the concentration of the alkyl-phosphonic acid in the solution may be at least about 0.1 mM, at least about 0.5 mM, or at least about 1 mM. In some embodiments, the concentration of the alkyl-phosphonic acid in the solution may be about 10 mM or less, about 5 mM or less, or about 1 mM or less. The concentration of the alkyl-phosphonic acid in the solution may be between about 0.1 and about 10 mM, between about 0.5 and about 5 mM, or approximately 1 mM.

A suitable volume of the coating composition solution may be provided based on the surface area of the substrate to be coated. In some embodiments, the solution is prepared by combining the surface modifying chemical and the solvent by mixing or any other suitable means. In some embodiments, multiple batches of the solution may be prepared. For example, one batch may be prepared for each repetition step at block 114, described below.

At block 106, the surface of the substrate is contacted with the coating composition. As used herein, "contact" refers to any means by which the coating composition and the surface can be brought together. For example, the substrate may be immersed by dipping the substrate into a vessel containing the coating composition (such as in the system 600 discussed below). Alternatively, the substrate may be positioned in a vessel and then the coating composition is introduced into the vessel (such as in the system 610 described below) via pumping, flowing, pouring, etc. In other embodiments, the coating composition may be sprayed or poured onto the surface of the substrate.

In some embodiments, the contacting step is performed in situ. For example, where the substrate comprises one or more plates or tubes of a heat exchanger, the coating composition may be introduced into the heat exchanger itself and the plates or tubes allowed to soak in the coating composition. In other embodiments, the plates/tubes of the heat exchanger may be removed and the contacting step may be performed in a separate vessel.

The surface may be contacted with the coating composition for a suitable period of time to allow at least a portion of the surface modifying chemical to be grafted to the surface. The period of time may be at least 10 minutes, at least 20 minutes, or at least 30 minutes. In some embodiments, the time period may be about 60 minutes or less, about 40 minutes or less, or about 30 minutes or less. In some embodiments, the time period may be between about 10 and about 60 minutes, between about 20 and 40 minutes, or approximately 30 minutes. In other embodiments, a longer period in the order of hours may be used. This step may be performed at ambient temperature or any other suitable temperature. As used herein, "ambient temperature" or "room temperature" refers to a temperature of a temperature-controlled building or environment. For example, room temperature may be between about 15° C. and about 30° C. or between about 19° C. and about 25° C. Thus, the contacting step may be performed without the application of heat.

Optionally, excess coating composition may be removed from the coated surface prior to the steps at block 108. For example, if the substrate contacts the solution within a vessel or the heat exchanger itself, the vessel/heat exchanger may be purged with an inert gas such as nitrogen. As another example, the substrate may be removed from the vessel and the excess coating composition may be allowed to drain off of the substrate before the next step is performed.

In some embodiments, the surface modifying chemical is bonded to the surface. The surface modifying chemical may be bonded to the surface via any bonding mechanism including, but not limited to, hydrogen bonding, covalent bonding, and/or Van der Waals interactions.

In embodiments in which the surface modifying compound is polysiloxane or alkyl silane, siloxane and/or silane groups may be covalently bonded to the surface. The resulting siloxane/silane coating may comprise repeating units of formula (IV):

(IV)

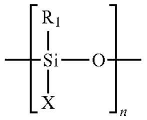

where $R_1$ and n are as defined above and X is a bond with the surface. The bond may be a covalent bond or any other suitable form of bond including multiple Van der Waals interactions. In some embodiments, X is —O-M, where M is a metal. The metal may be any of the metals discussed above for the substrate. Hereafter, the terms "siloxane coating" and "silane coating" are used interchangeably to refer to a coating comprising repeating units of formula (IV).

In other embodiments, where the surface modifying compound is alkyl-phosphonic acid, a phosphonate group may be covalently bonded to the surface. The resulting phosphonate coating may have formula (V):

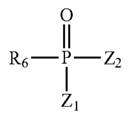

(V)

where $R_6$ is defined above and $Z_1$ and $Z_2$ are each a bond to the substrate. Each of bonds $Z_1$ and $Z_2$ may be a covalent bond or any other suitable form of bond. In some embodiments, $Z_1$ and $Z_2$ are each —O-M, where M is a metal. The metal may be any of the metals discussed above for the substrate. It will be noted that some phosphonate groups may only have one bond to the surface ($Z_1$ or $Z_2$) and may have —OH or $O^-$ at the other of $Z_1$ and $Z_2$.

At block 108, the coated surface is heat treated at a first temperature for a first time period. Heat treatment of the coated surface may also be referred to as "curing". In some embodiments, the coated surface may be heated using a heating medium. The heating medium may be a heated inert gas or vapor such as steam, hot air, hot nitrogen, or any other heated non-reactive gas or vapor. In embodiments in which the heating medium is steam, the steam can be of varying quality including steam that is superheated, saturated, or neither superheated nor saturated. In other embodiments, the heating medium may be a heated liquid, such as hot water.

In embodiments in which the heating medium is a gas or vapor, the heating medium may contact the coated surface directly. For example, the heat treatment may be performed in situ and the heating medium may be introduced into the heat exchanger to contact the coated surface of the plates or tubes. Alternatively, the substrate may be placed in a vessel (e.g. the vessel 604 of the system 600 discussed below) and the heating medium may be introduced into the vessel.

In some embodiments, it may not be desirable to have the medium contact the coated surface directly. In these embodiments, the heating medium may be used to heat the coated surface indirectly. In embodiments where the heat treatment is being performed in situ in a heat exchanger, the heating medium may be passed through the heat exchanger on the opposite side of the coated surface. For example, in a shell-and-tube heat exchanger, the coating may only be on the interior of the tubes and the heating medium may be flowed through the shell around the exterior of the tubes to indirectly heat the coated surfaces. This indirect heating technique can be used for high temperature heat treatments, for example, using vapor-phase heating media or high-boiling-point fluids (e.g. glycols). The indirect heating technique is also useful for lower temperature heat treatments using liquids instead of vapors (e.g. liquid water below 100° C.).

In other embodiments, the heat treatment step may be performed by heating the ambient air around the coated substrate, without application of an additional heating medium. For example, the coated surface may be heated by placing the coated substrate in a heating apparatus, such as an oven, and raising the temperature within the apparatus. In other embodiments, the heat treatment step may be performed with a temperature-controlled heat gun or any other suitable heating device.

In all embodiments, the heat may be approximately uniformly distributed across the surface to facilitate even curing.

The first temperature may be at least about 40° C., at least about 50° C., or at least about 60° C. In some embodiments, the first temperature may be about 100° C. or less, about 90° C. or less, or about 80° C. or less. In some embodiments, the first temperature is between about 40° C. and about 100° C., between about 50° C. and about 90° C., or between about 60° C. and about 80° C. In some specific examples, the first temperature may be approximately 60° C. (for a phosphonate coating) or approximately 80° C. (for a siloxane coating).

The first time period may be at least about 30 minutes, at least about 45 minutes, or at least about 1 hour. The first time period may be about 2 hours or less, about 1.5 hours or less, or about 1 hour or less. In some embodiments, the first time period may be between about 30 minutes and 2 hours, between about 45 minutes and 1.5 hours, or about 1 hour.

At block 110, the coated surface is heat treated at a second temperature for a second period of time. This second heat treatment step may use any of the heating techniques discussed above for the first heat treatment step at block 108. The second heat treatment step may use the same heating technique as the first heat treatment step or a different technique.

The second temperature may be higher than the first temperature. For example, the second temperature may be at least about 100° C., at least about 110° C., or at least about 120° C. The second temperature may be about 160° C. or less, about 150° C. or less, or about 140° C. or less. In some embodiments, the second temperature is between about 100° C. and about 160° C., between about 110° C. and about 150° C., or between about 120° C. and about 140° C. In some specific examples, the second temperature may be approximately 120° C. (for a phosphonate coating) or approximately 140° C. (for a siloxane coating).

The second time period may be at least about 1 hour, at least about 1.5 hours, or at least about 2 hours. The second time period may be about 3 hours or less, about 2.5 hours or less, or about 2 hours or less. In some embodiments, the second time period may be between about 1 hour and 3 hours, between about 1.5 hours and about 2.5 hours, or about 2 hours.

At block 112, the coated surface is heat treated at a third temperature for a third period of time. This third heat treatment step may use any of the heating techniques discussed above for the first heat treatment step at block 108. The third heating step may use the same heating technique as the first and/or second heating steps or a different technique.

The third temperature may be higher than the second temperature. For example, the third temperature may be at least about 110° C., at least about 120° C., or at least about 130° C. The third temperature may be about 180° C. or less, about 170° C. or less, or about 160° C. or less. In some embodiments, the third temperature is between about 110° C. and about 180° C., between about 120° C. and about 170° C., or between about 130° C. and about 160° C. In some specific examples, the third temperature may be approximately 130° C. (for a phosphonate coating) or approximately 160° C. (for a silane coating).

The third time period may be at least about 30 minutes, at least about 45 minutes, or at least about 1 hour. The third time period may be about 2 hours or less, about 1.5 hours or less, or about 1 hour or less. In some embodiments, the third time period may be between about 30 minutes and 2 hours, between about 45 minutes and 1.5 hours, or about 1 hour.

The combination of the three heat treatment steps of blocks 108, 110, and 112 may thereby substantially cure the coating composition prior to the steps at block 114 such that the coating composition transforms from a liquid solution to a solid or semi-solid coating bonded to the surface of the substrate. This three-step curing technique using increasing temperatures for relatively long periods is thought to provide improved curing in comparison to other conventional coating techniques that just use a single curing step at a high temperature for a short period of time. Performing the three-step curing technique prior to adding the next coating layer at block 114 may help to ensure a strong bond between the coating and the surface and may thereby prevent uneven coating coverage and/or pealing. The three-step curing technique may also increase the longevity of the coating.

Alternative embodiments are also contemplated in which only one or two heating steps are performed, for example, at a higher temperature and/or for a longer period of time. For example, for the silane/siloxane coating composition, one or more heat treatment steps may be performed at a temperature of 60 to 180° C. for 1 to 6 hours. For a phosphonate coating composition, one or more heat treatment steps may be performed at a temperature of 60 to 150° C. for 1 hour to 24 hours.

At block 114, the contacting step at block 106 and the heat treatment steps at blocks 108, 110, and 112 are repeated at least one additional time. In some embodiments, the steps at block 104 are also repeated if additional coating composition is needed. In some embodiments, the contacting and heating steps are repeated two additional times, three additional times, four additional times, or any other suitable number of repetitions. Each repetition may be referred to as adding an additional "layer" of the coating. The resulting coating may therefore have at least two layers, or between two and five layers, or any other suitable number of layers. However, it will be understood that each "layer" in this context may be an increase in the density of the silane/siloxane or phosphonate groups bonded to the surface of the substrate (i.e., providing more "coverage" on the surface) and not necessarily an increase in the thickness of the coating.

Figure 2A:
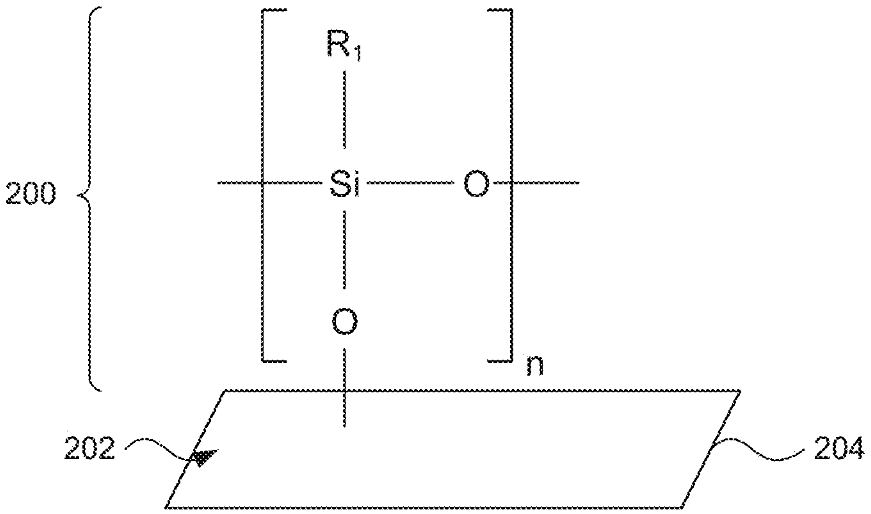
FIGS. 2A, 2B, and 2C are chemical schematics of a siloxane coating, a phosphonate coating, and a combination siloxane/phosphonate coating respectively.
Figure 2B:
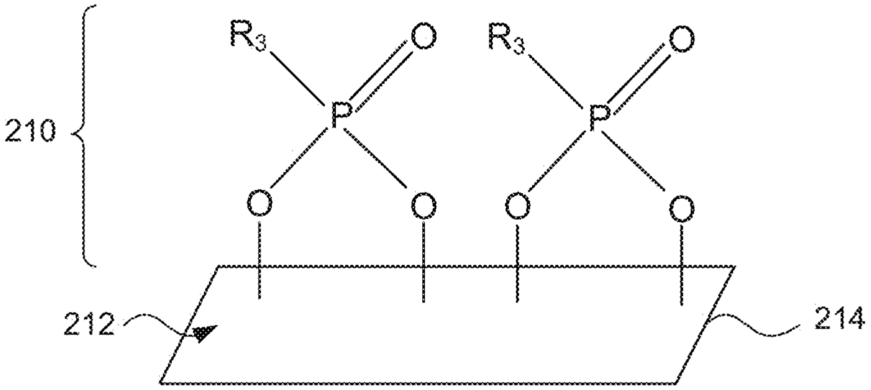

FIG. 2A is a chemical schematic of an example siloxane coating 200 on a surface 202 of a substrate 204 formed by the method 100. One siloxane group is shown grafted to the surface 202 but it will be understood that the coating will be formed by a plurality of siloxane groups spread over the surface 202. FIG. 2B is a schematic of an example phosphonate coating 210 on a surface 212 of a substrate 214. In this example, two phosphonate groups are shown grafted to the surface 212 but it will be understood that the coating will be formed by a plurality of phosphonate groups spread over the surface 212. Each of the coatings 200, 210 may have a thickness in the order of micrometers or nanometers. In some embodiments, the coatings 200, 210 are each a monolayer. As used herein, "monolayer" or "self-assembled monolayer" or "SAM" refers to a relatively regular assembly of molecules in a single layer across a surface.

Other variations of the method 100 are possible in order to produce coatings with varying molecular structure. For example, alternative embodiments are contemplated in which the coating composition at block 104 comprises both a silane/siloxane and an alkyl-phosphonic acid. The ratio of silane/siloxane to alkyl-phosphonic acid in the coating composition may be selected based on the desired density of silane/siloxane and phosphonate groups on the surface of the substrate. The ratio of silane/siloxane to phosphonate groups may be in the range of 30:70 to 70:30 (mole:mole). In these embodiments, the temperature and time of the heat treatment steps may be adjusted appropriately. For example, one or more heat treatment steps may be performed at a temperature of 60 to 180° C. for 1 to 24 hours.

FIG. 2B is a schematic of an example "combination" siloxane and phosphonate coating 220 on a surface 222 of a substrate 224. In this example, the siloxane and phosphonate groups are shown as alternating (S—P—S—P); however, it will be understood that the arrangement of the groups on the surface 222 will be random and portions of the surface 222 will have a variety of other arrangements (e.g. S—S—P—P, S—P—P—S, etc.). It is also possible that some of the siloxane and phosphonate groups will react with one another and form various configurations such as siloxane-phosphonate, phosphonate-siloxane, siloxane-phosphonate-siloxane, phosphonate-siloxane-phosphonate, etc.

Figure 3:
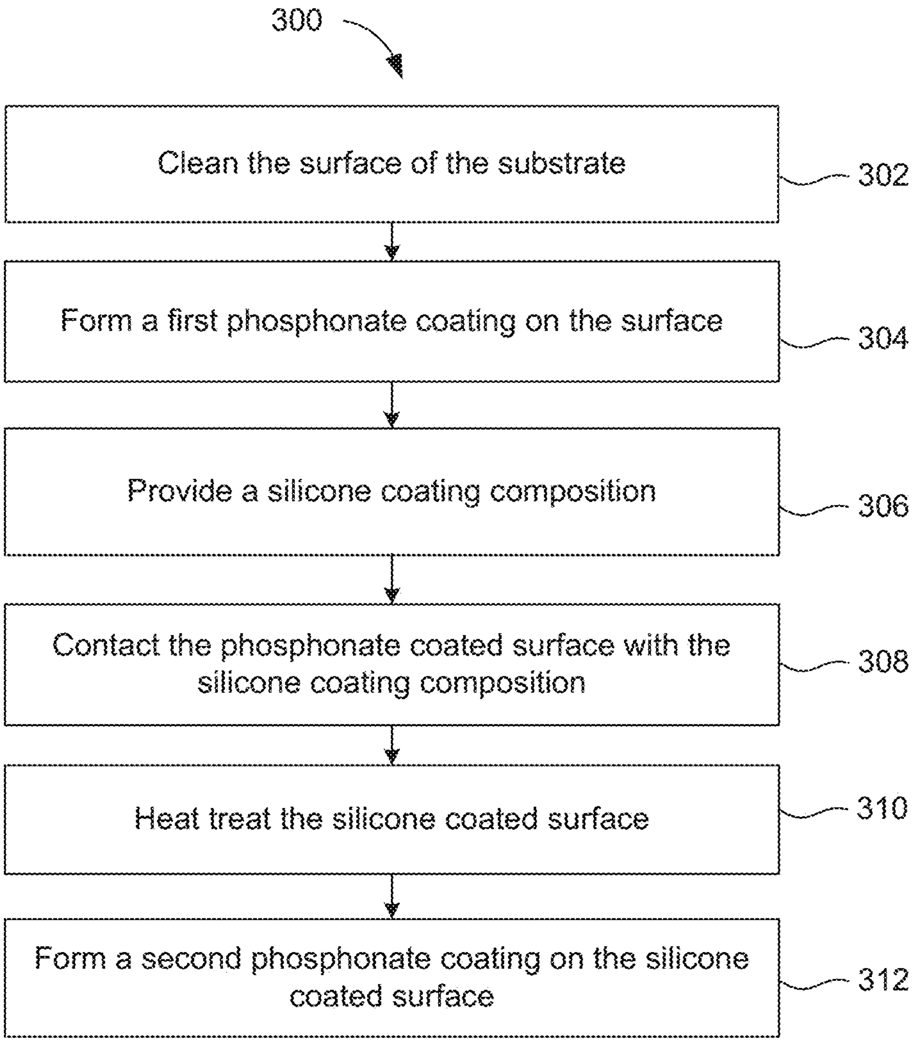
FIG. 3 is a flowchart of another example method, according to some embodiments.

FIG. 3 is a flowchart of another example method 300 for forming a coating on a substrate, according to some embodiments. The substrate may be any of the substrates discussed above for the method 100.

At block 302, the surface of the substrate is cleaned. The steps at block 302 may be similar to the steps at block 102 of the method 100 as described above.

At block 304, a first phosphonate coating is formed on the surface. The phosphonate coating may be formed by performing steps similar to those at blocks 104 to 114 of the method 100. In brief, a coating composition may be provided comprising an alkyl-phosphonic acid such as ODPA. The surface of the substrate may then be contacted with the coating composition in a similar manner to block 106 of the method 100, followed by a three-step heat treatment similar to blocks 108, 110, and 112 or a modified heat treatment procedure with one or two heat treatment steps. Finally, the contacting and heat treatment steps may be repeated at least once. In this example, the contacting and heat treating steps are repeated twice.

Optionally, the phosphonate-coated surface is cooled prior to the steps at block 306. For example, the plate may be cooled in air to approximately room temperature. The phosphonate-coated surface may also be cleaned to remove any excess ODPA, for example, by washing the plate with methanol or any other suitable solvent.

At block 306, a silicone polymer coating composition is provided. The silicone coating composition may comprise a silicone base polymer.

In some embodiments, the silicone base polymer may have formula (VI):

(VI)

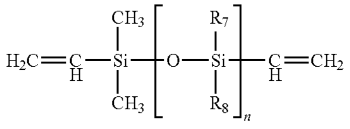

where $R_7$ and $R_8$ are independently selected alkyl groups and n is the degree of polymerization. The alkyl groups may be any of the groups discussed above with respect to $R_1$ of formula (I), including partially or fully hydrogenated alkyl groups or partially or fully fluorinated groups. The degree of polymerization (n) may be at least 1, at least 5, or at least 10. In some embodiments, n is between 10 and 60, or greater.

In some embodiments, the silicone base polymer may be a polydimethylsiloxane (PDMS) base polymer in which $R_7$ and $R_8$ of formula (VI) are both methyl (—CH3) groups. The degree of polymerization (n) may be about 60 or any other suitable degree of polymerization.

The silicone coating composition further comprises a cross-linking compound. The ratio of silicone base polymer to the cross-linking compound may be between about 5:1 and about 20:1 or approximately 10:1 (w/w). In some embodiments, the cross-linking compound has formula (VII):

(VII)

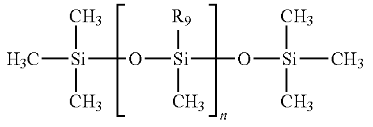

where $R_9$ is an alkyl group, partially substituted with —H. In other words, some of the $R_9$ groups are alkyls and some are —H. The alkyl groups may be any of the groups discussed above with respect to $R_1$ of formula (I), including partially or fully hydrogenated alkyl groups or partially or fully fluorinated groups. The degree of polymerization (n) may be at least 2, at least 5, or at least 10. In some specific embodiments, $R_9$ is a methyl group (—CH3) and n is about 10.

In other embodiments, the cross-linking compound may comprise methylvinylcyclosiloxane (or tetravinylcyclotetrasiloxane) or any other suitable cross-linking compound containing at least one Si—H bond.

In some embodiments, the silicone coating composition further comprises a catalyst such as a platinum-based catalyst. In some embodiments, the silicone coating composition may be the SYLGARD™ 182, 184, or 186 Silicone Elastomer Kit from Dow Corning (Midlands, Michigan), which includes a polymer base and a curing agent comprises a cross-linking compound and a platinum-based catalyst.

The silicone coating composition may be a solution and may further comprise a solvent. In some embodiments, the solvent is an organic solvent. In some embodiments, the organic solvent is an alkane solvent such as hexane. The ratio of the PDMS base polymer to the solvent may be between about 1:50 and about 1:200, or approximately 1:100.

At block 308, the phosphonate-coated surface is contacted with the silicone coating composition. In some embodiments, the entire substrate is immersed in the silicone coating composition. For example, the substrate may be immersed by dipping the substrate into a vessel containing the coating composition or the substrate may be positioned in a vessel first and then the coating composition is pumped, flowed, or poured into the vessel. In other embodiments, the silicone coating composition may be sprayed or poured onto the phosphonate-coated surface of the substrate.

In some embodiments, the contacting step is performed in situ. For example, where the substrate comprises one or more plates or tubes of a heat exchanger, the silicone coating composition may be introduced into the heat exchanger itself and the plates or tubes allowed to soak in the silicone coating composition. In other embodiments, the plates/tubes of the heat exchanger may be removed and the contacting step may be performed in a separate vessel.

The phosphonate-coated surface is contacted with the silicone coating composition for a suitable period of time. The period of time may be at least 30 minutes, at least 1 hours, or at least 2 hours. The period of time may be about 4 hours or less, about 3 hours or less, or about 2 hours or less. In some embodiments, the period of time is between about 30 minutes and 4 hours, between about 1 hour and about 3 hours, or about 2 hours. This step may be performed at ambient (room) temperature or any other suitable temperature.

In some embodiments, the excess silicone coating composition is removed, for example, by inert gas purging or by allowing the excess to drip off of the surface.

At block 310, the silicone-coated surface is heat treated/cured. The heat treatment may be performed in one step or in two or more steps. In some embodiments, the silicone-coated surface is heat treated at a first temperature for a first period of time, followed by heat treating at a second temperature for a second period of time. The heat treatment steps can be performed in situ as discussed above.

The first temperature may be at least about 60° C., at least about 70° C., or at least about 80° C. In some embodiments, the first temperature is about 100° C. or less, about 90° C. or less, or about 80° C. or less. In some embodiments, the first temperature is between about 60° C. and about 100° C., between about 70° C. and about 90° C., or about 80° C. The first time period may be at least about 12 hours, at least 14 hours, or at least 16 hours. The first time period may be about 20 hours or less, about 18 hours or less, or about 16 hours, or less. In some embodiments, the first time period is between about 12 hours and about 20 hours, between about 14 hours and about 18 hours, or about 16 hours.

The second temperature may be at least about 100° C., at least about 110° C., or at least about 120° C. The second temperature may be about 140° C. or less, about 130° C. or less, or about 120° C. or less. In some embodiments, the second temperature is between about 100° C. and about 140° C., between about 110° C. and about 130° C., or approximately 120° C. The second time period may be at least about 30 minutes, at least about 1 hours, or at least about 2 hours. In some embodiments, the second period of time is between about 30 minutes and 4 hours, between about 1 hour and about 3 hours, or about 2 hours.

Figure 4A:
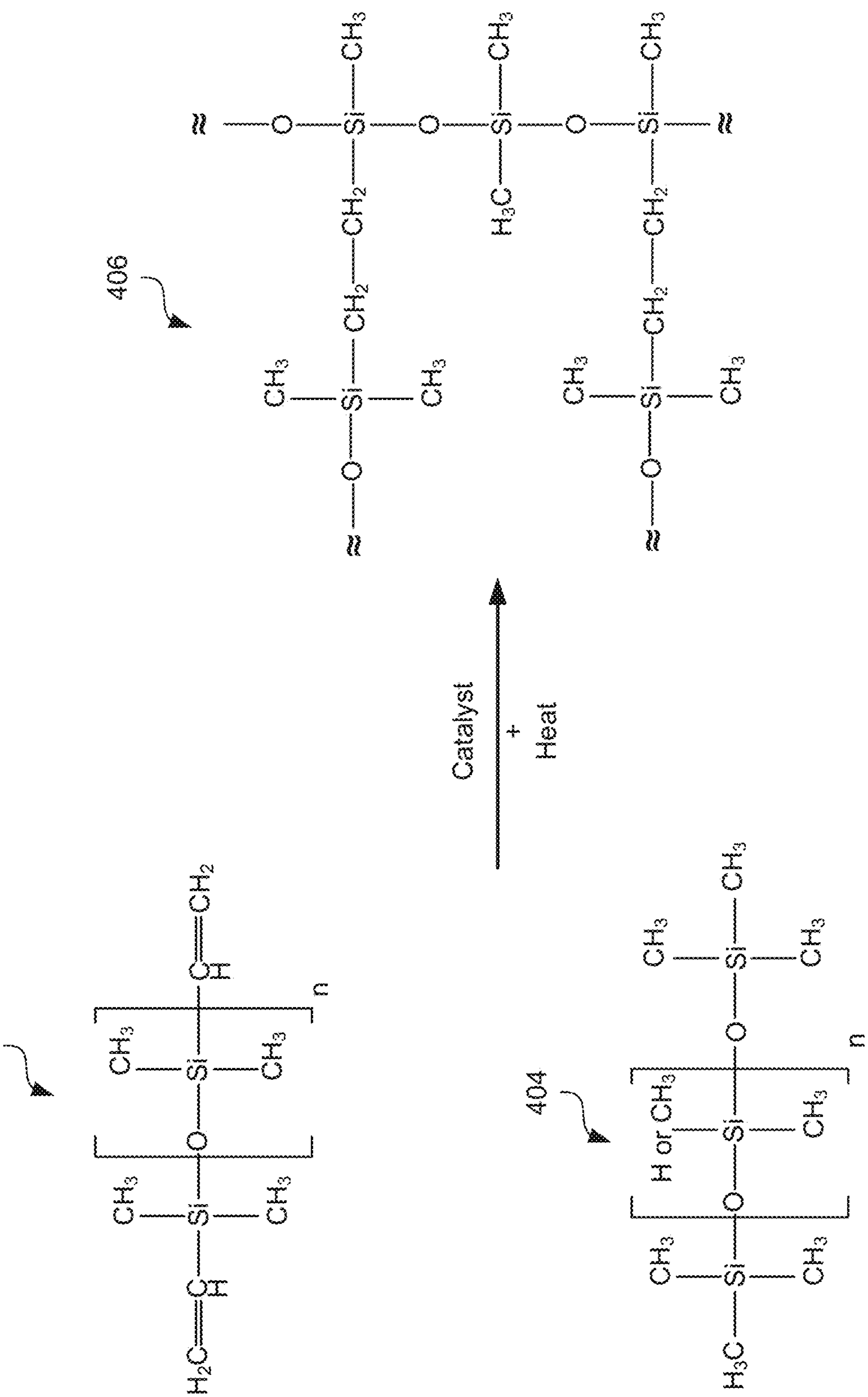
FIG. 4A is a chemical schematic of an example cross-linking reaction for forming a silicone coating layer, according to some embodiments.

The heat treatment step(s) may accelerate the cross-linking reaction between the silicone polymer base and the cross-linking compound. FIG. 4A shows an example reaction between a PDMS base polymer 402 in which $R_7$ and $R_8$ of formula (VI) are both methyl (—CH3) groups and a cross-linking compound 404 in which $R_9$ alternates between —$CH_3$ and —H groups (adapted from Li et al. (2023) Functional PDMS Elastomers: Bulk Composites, Surface Engineering, and Precision Fabrication. *Advanced Science* 10, 2304506, incorporated herein by reference). A catalyst, in the presence of heat, catalyzes the addition of SiH bonds across the vinyl groups of the PDMS base polymer 402, thereby forming Si—$CH_2$-$Ch_2$—Si linkages with the cross-linking compound 404 to generate a three-dimensional silicone polymer matrix/network 406.

At block 312, a second phosphonate coating is formed on the silicone-coated surface. The second phosphonate coating may be formed in a similar manner to the first phosphonate coating as described above. In brief, the silicone-coated surface may be contacted with another coating composition comprising alkyl-phosphonic acid, followed by heat treatment/curing steps similar to blocks 108, 110, and 112 of the method 100 described above. The contacting and curing steps may be repeated at least once (e.g. twice, thrice, etc.) to obtain the desired coverage. The contacting and curing steps can be performed in situ as discussed above.

In alternative embodiments, the steps at block 312 may be omitted and the coating may only comprise the first phosphonate layer and the silicone layer thereon.

Figure 4B:
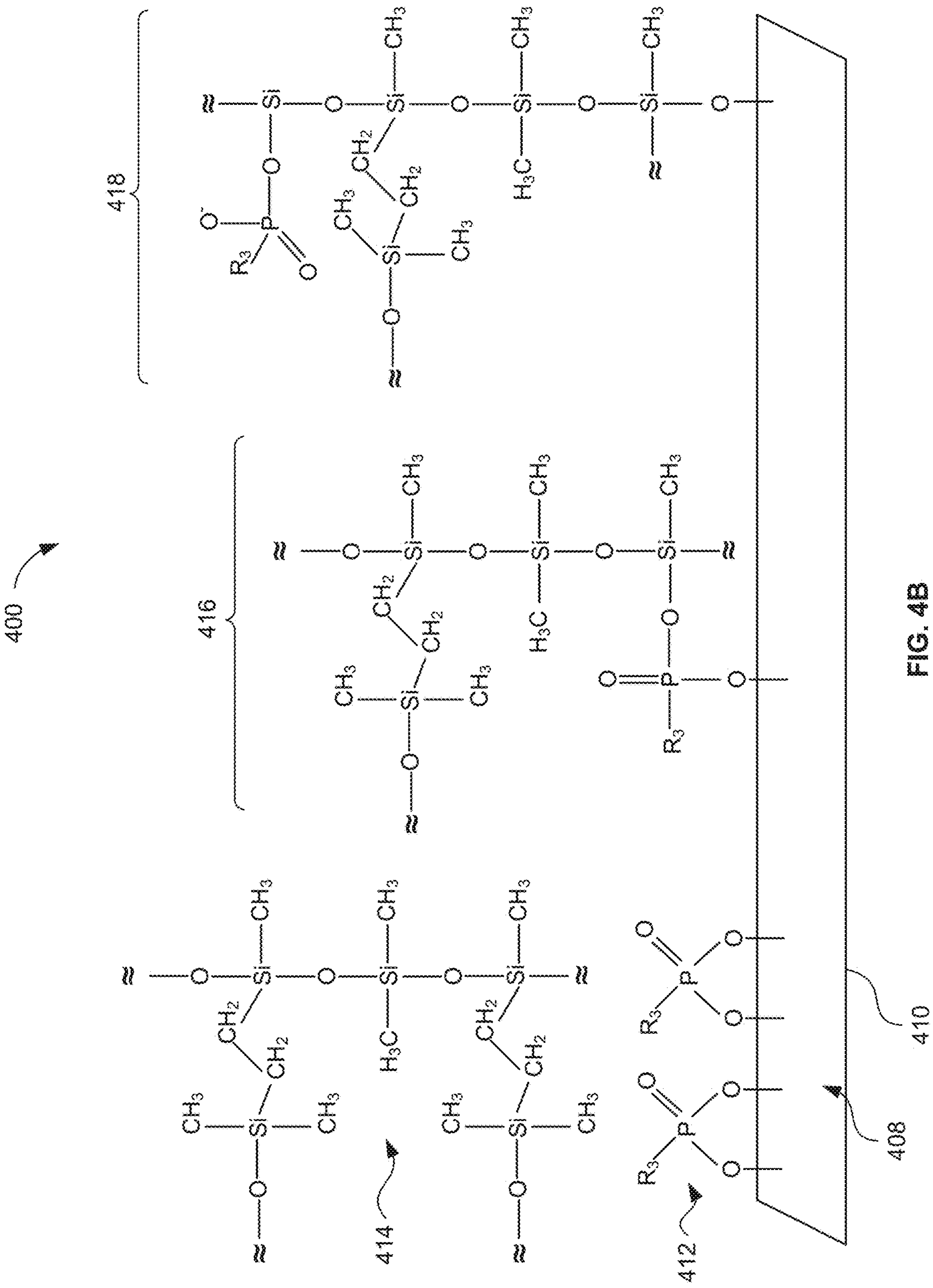
FIG. 4B is a chemical schematic of an example siloxane-phosphonate coating formed by the method of FIG. 3, according to some embodiments.

FIG. 4B is a chemical schematic of an example multilayer coating 400 that may be formed by the method 300 of FIG.

3. The coating 400 is shown on a surface 408 of a substrate 410. The coating 400 may have a thickness in the order of micrometers or nanometers.

The coating 400 may at least partially comprise discrete layers of a phosphonate coating 412 grafted to the surface 408 and a silicone coating 414 forming an overlay on top of the phosphonate coating 412. However, some of the cross-linked siloxane molecules of the silicone polymer matrix may also bond with some of the phosphonate groups, for example via an unreacted SiH of the cross-linker compound reacting with a hydroxyl group of the phosphonate. Thus, the coating 400 may further comprise a variety of multimolecular configurations of phosphonate and siloxane. For example, some siloxane molecules may bind to one or more phosphonate groups grafted to the surface 408 to form a phosphonate-siloxane configuration (such as configuration 416 in FIG. 4B). As another example, some siloxane molecules may be grafted directly to the surface 408 and one or more phosphonate groups may be bonded thereto via the optional second phosphonate coating step 312 of the method 300. An example siloxane-phosphonate configuration 418 is shown in FIG. 4B. In addition, the coating 400 may also comprise individual siloxane molecules alone grafted to the surface 408 without necessarily being bound to any phosphonate groups. Other configurations are also possible including siloxane-phosphonate-siloxane, phosphonate-siloxane-phosphonate, and/or other multi-layer arrangements.

Figure 2C:
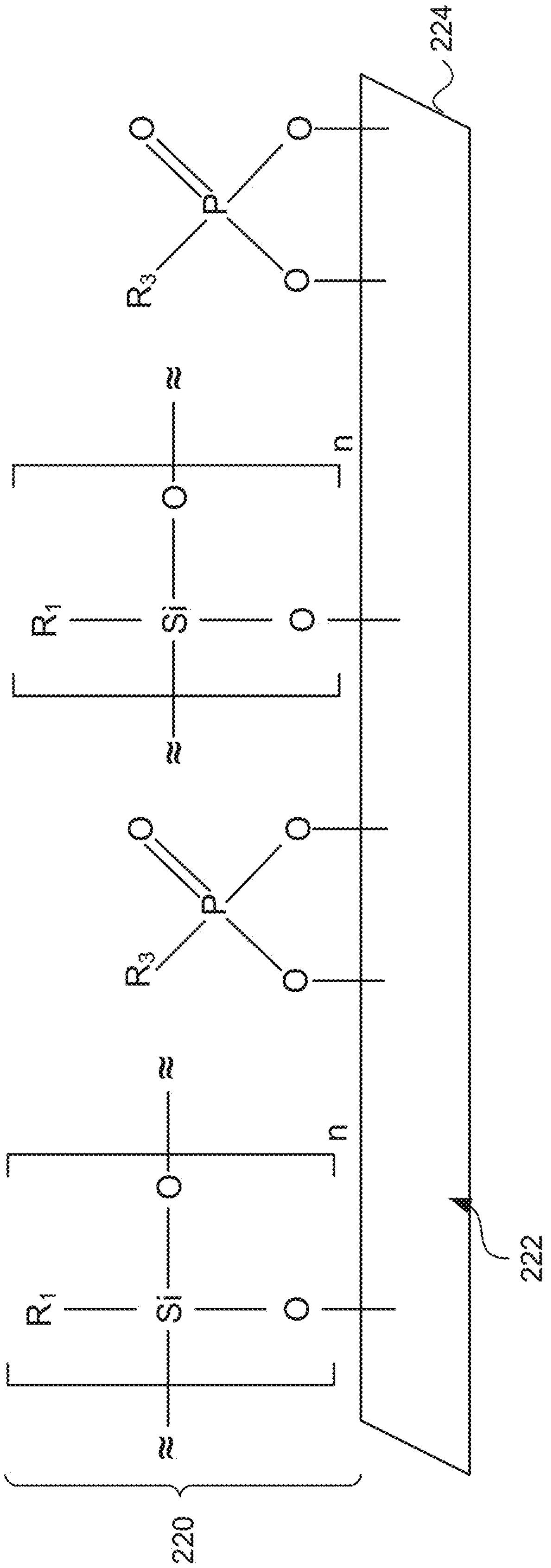

Other variations of the method 300 are also possible to produce coatings with additional molecular configurations. In some embodiments, the first coating step 304 may comprise forming a combination siloxane/phosphonate coating as discussed above for the method 100 and shown in FIG. 2C. The R groups of the siloxane and phosphonate groups may be any of the R groups discussed above. A silicone coating may then be formed on top of the siloxane/phosphonate coating. The silicone coating may form an overlay over portions of the siloxane/phosphonate coating and some silicone molecules may also react with some of the siloxane and/or phosphonate groups to form a variety of molecular configurations including, for example, siloxane-phosphonate, phosphonate-siloxane, siloxane-phosphonate-siloxane, phosphonate-siloxane-phosphonate, phosphonate-PDMS, PDMS-phosphonate, siloxane-PDMS, PDMS-siloxane, siloxane-phosphonate-PDMS, phosphonate-siloxane-PDMS and many other possible combinations.

As demonstrated in the Examples below, embodiments of the coatings produced by the methods 100 and 300 repel both water and oil and may be nearly omniphobic with a tendency towards "low-wettability" (i.e. little to no oil or water wettability). The coatings may have "neutral wettability" and a neutral contact angle such that there is no preferential wettability for oil or water. The wettability of the coating may be measured by determining a contact angle of the coated surface. As used herein, "contact angle" refers to the angle at which the liquid-vapor interface meets the solid-liquid interface of a liquid in contact with the surface. The coated surfaces provided herein may have a hydrophobic contact angle of at least about 90°, at least about 100°, at least about 115°. Even higher contact angles upwards of at least about 130° or at least about 160° are also possible. In some embodiments, the contact angle is between about 90° and about 130°, between about 100° and about 120°, or between about 110° and about 115°. In contrast, the hydrophobic contact angles on uncoated, bare surfaces are typically in the range of 20° to 30° and often less than 20° at process temperature. The experiments in the Examples below also indicated that substrates coated with the disclosed coatings display thermal stability at temperatures of at least 200° C. The coatings are also substantially smooth and uniform, owing to the coatings being formed by molecular deposition/grafting rather than particle deposition as in conventional coating methods, therefore reducing the possibility that the coatings "peel off" or "chip off" of the coated surface.

The number of layers of the coating may affect the contact angle. For example, the inventors have found that the contact angle increases from one coating layer to two layers to three layers. However, too many layers may increase the risk of the coating pealing from the surface. The optimal number of layers may at least partially depend on the type of surface to be coated. For example, if the surface is relatively rough and/or dirty, more layers may help to ensure that the surface is fully covered and thus improve the coating's performance.

The "multilayer" phosphonate+silicone polymer coatings formed by the method 300 may have a higher contact angle than a phosphonate-only coating. Without being limited by theory, it is believed that the silicone (e.g. PDMS) coating layer may facilitate removal of fouling from the coated surface by reducing the bonding strength of the foulants. It is also believed that the additional optional phosphonate coating layer on the PDMS surface enhances the overall hydrophobicity of the coating.

Moreover, utilizing silane/siloxane and alkyl-phosphonic acid compounds with fluorinated R groups may further enhance hydrophobicity and thermal tolerance of the resulting coatings. It is hypothesized that contact angles of up to 165° (or higher) are possible.

Thus, the methods disclosed herein can produce coatings with various molecular configurations in single monolayers and overlay assemblies. Multilayer coatings still retain thicknesses in the order of microns or nanometers.

Figure 5:
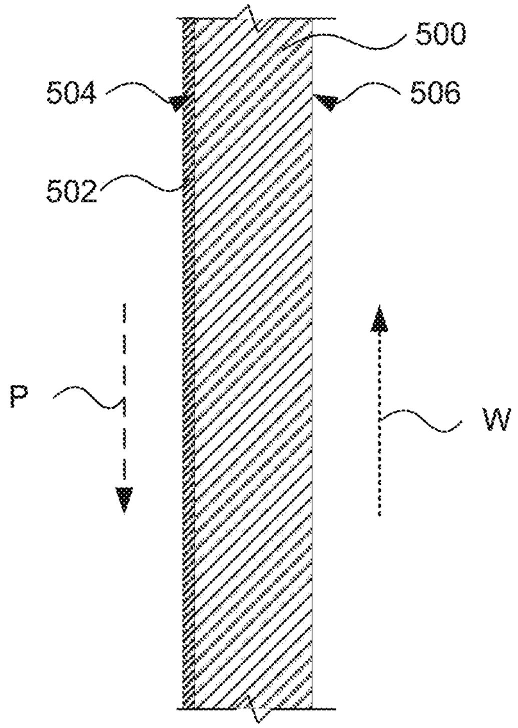
FIG. 5 is a cross-sectional side view of a substrate coated by the methods of FIG. 1 or 3, according to some embodiments.

FIG. 5 is a cross-sectional side view of a substrate 500 with a coating 502. The coating 502 may be any embodiment of the coatings discussed above and may be produced by any embodiment of the method 100 or 300.

In this embodiment, the substrate 500 is a portion of a heat exchanger surface (the rest of the heat exchanger is not shown). The heat exchanger may be a shell and tube heat exchanger, a tube in tube heat exchanger, a double tube heat exchanger, a plate heat exchanger, or any other suitable type of heat exchanger. The plate heat exchanger may be a parallel plate heat exchanger or any other suitable type of plate heat exchanger.

In some embodiments, the substrate 500 is a heat transfer portion of the heat exchanger. As used herein, "heat transfer portion" or "heat transfer section" are used interchangeably to refer to a portion of the heat exchanger through which heat is transferred. For example, the heat transfer portion may be a tube wall (or portion thereof) of a shell and tube heat exchanger, a tube in tube heat exchanger, or a double tube heat exchanger. Alternatively, the heat transfer portion may be a plate (or portion thereof) of a plate heat exchanger. In other embodiments, the substrate 500 may be any other heat transfer portion of the heat exchanger.

Each of the opposed surfaces of the heat transfer portion may be referred to as a "heat transfer surface". In this embodiment, the substrate 500 has a first heat transfer surface 504 and a second heat transfer surface 506.

The substrate 500 may transfer heat between a "process fluid" (i.e. the fluid intended to be heated or cooled; indicated by arrow "P" in FIG. 4) and a "working fluid" (i.e. the fluid that transfers heat to, or absorbs heat from, the process fluid; indicated by arrow "W" in FIG. 4). The process fluid can be either heated or cooled by the working fluid. The heat transfer surface of the substrate 500 in contact with the process fluid may be referred to as the "process fluid surface" and the opposite side may be referred to as the "working fluid surface". In this embodiment, the first heat transfer surface 504 is the process fluid surface and the second heat transfer surface 506 is the working fluid surface. In other embodiments, the substrate 500 may transfer heat between two process fluids of different temperatures and both heat transfer surfaces 504, 506 may be process fluid surfaces.

In some embodiments, the heat exchanger may be installed at a processing facility of an oil recovery operation and the process fluid may be produced fluid (oil or water) from a thermal oil recovery process. Non-limiting examples of thermal oil recovery processes include Steam Assisted Gravity Drainage (SAGD), Cyclic Steam Stimulation (CSS), and Steam Flooding. In some embodiments, the process fluid for the heat exchanger is produced water that has been processed to separate the water from the oil and other components such as gas (hereafter referred to as "process water"). SAGD produced water and process water may each be in the form of an oil-in-water emulsion containing dispersed and dissolved organic matter including the oil, solvents or other additives if used, and possibly other natural organic matter from the reservoir.

In other embodiments, the process fluid for the heat exchanger may be produced fluid (oil or water) or process water from an Enhanced Oil Recovery (EOR) process, such as polymer flooding. In these embodiments, the produced water or process water may comprise a mixture of water, polymer, dispersed and dissolved organic matter, and other possible contaminants. In other embodiments, the process fluid for the heat exchanger may be any fluid containing dissolved and/or dispersed organic or inorganic matter that may result in fouling of heat exchange surfaces.

In the embodiment shown in FIG. 5, only the process fluid surface (i.e. the first heat transfer surface 504) is coated with the coating 502. In other embodiments, the working fluid surface (i.e. the second heat transfer surface 506) may be coated or both heat transfer surfaces 504, 506 may be coated. Coatings applied on the surfaces 504 and 506 may be identical or different. As demonstrated in the Examples below, the coating 502 may reduce or prevent fouling of the coated surface.

In other embodiments, the substrate 500 may be any other substrate that is potentially susceptible to fouling including, but not limited to: piping, tubing, plates, filters, storage tanks, emulsion treatment equipment, equipment parts, equipment walls, turbines, pumps, heat exchanger surfaces, well tubular surfaces, and/or any other fluid channel used in oil recovery operations or other industrial operations, including off-shore rig equipment and marine equipment, and any surfaces that may come in contact with oil, oil-in-water emulsions, water-in-oil emulsions, or any other oily or otherwise contaminated fluid. The coatings may potentially be used across various grades of steel and metals (carbon steel, stainless steel, alloy steel, titanium, aluminum, and others).

Figure 6A:
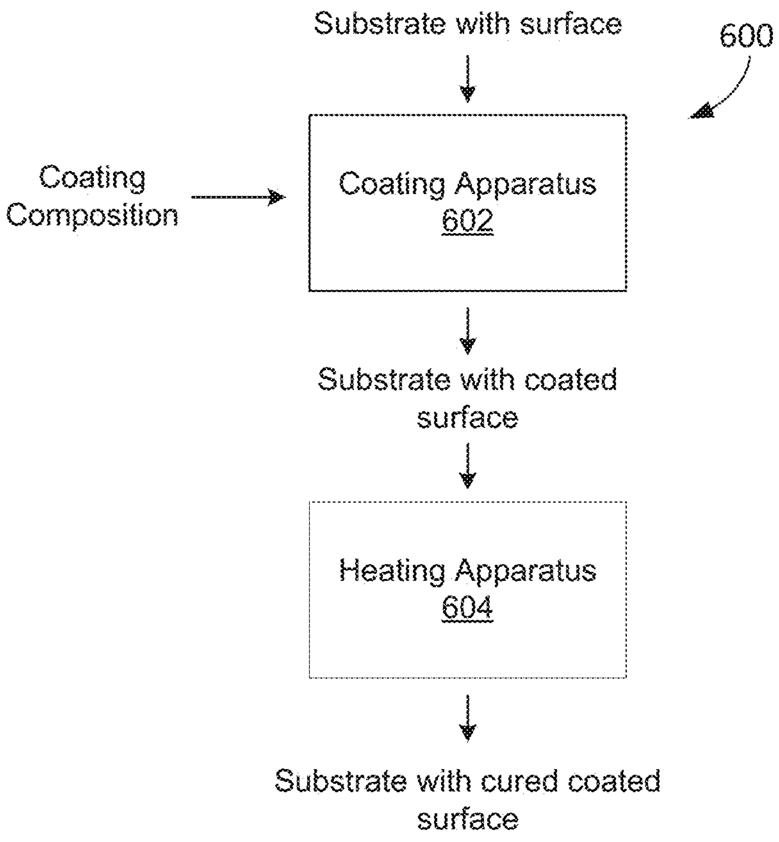
FIG. 6A is a functional block diagram of an example system that may implement the methods of FIGS. 1 and 3, according to some embodiments.

FIG. 6A is a functional block diagram of an example system 600 that may be used to implement embodiments of the methods 100 and 300 disclosed herein. The system 600 in this embodiment comprises a coating apparatus 602 and a heating apparatus 604.

The coating apparatus 602 is configured to receive a substrate with a surface to be coated. In some embodiments, the coating apparatus 602 is a suitably sized vessel such as a tank, bath, etc. The size of the vessel may be selected based on the size of the substrate to be coated. The coating apparatus 602 is also configured to receive a coating composition therein. In some embodiments, the coating apparatus 602 comprises a vessel with a top opening to allow the coating composition to be poured therein. In other embodiments, the vessel may have an inlet and may be fluidly connected to a pump such that the coating composition can be pumped into the vessel via the inlet. In some embodiments, the vessel may further comprise an outlet or drain to remove excess coating composition after the surface of the substrate has been coated.

The heating apparatus 604 may be configured to receive the coated substrate and heat treat the coated substrate to cure the coating. In some embodiments, the heating apparatus 604 comprises an oven, such as a convection oven. In other embodiments, the heating apparatus 604 may be another suitable device for exposing the surface to a heating medium. The heating medium may be steam, hot air, hot nitrogen, or any other heated non-reactive gas or vapor. In embodiments in which the heating medium is steam, the steam can be of varying quality including steam that is superheated, saturated, or neither superheated nor saturated. In some embodiments, the heating device may be a steam oven or a steam chamber. In all embodiments, the heating device should be capable of approximately uniformly distributing the heat across the surface of the substrate.

In some embodiments, the heating apparatus 604 contains one or more mounting structures to mount the substrate therein. For example, the mounting structure may comprise one or more frames, grooves, brackets, and/or hangers that mount the substrate within the heating apparatus 604. In some embodiments, the heating apparatus 604 further comprises a gas injection port and an outlet port to provide gas (e.g. air or nitrogen) flow to flush volatile chemicals and/or excess coating solution from the apparatus.

In some embodiments, the system 600 further comprises a cleaning apparatus (not shown). The cleaning apparatus may be configured to clean the surface of the substrate, prior to the substrate being coated. The cleaning apparatus may comprise, for example, a vessel configured to receive the substrate and a cleaning fluid such as one or more solvents and/or water. In some embodiments, the cleaning apparatus may be the same vessel as the coating apparatus 602.

In some embodiments, the system 600 further comprises one or more mixing apparatuses (not shown). The mixing apparatuses may be configured to mix a surface modifying compound with a solvent to form a coating composition. The mixing apparatus may be a vessel with a stirrer or any other suitable apparatus or device.

Figure 6B:
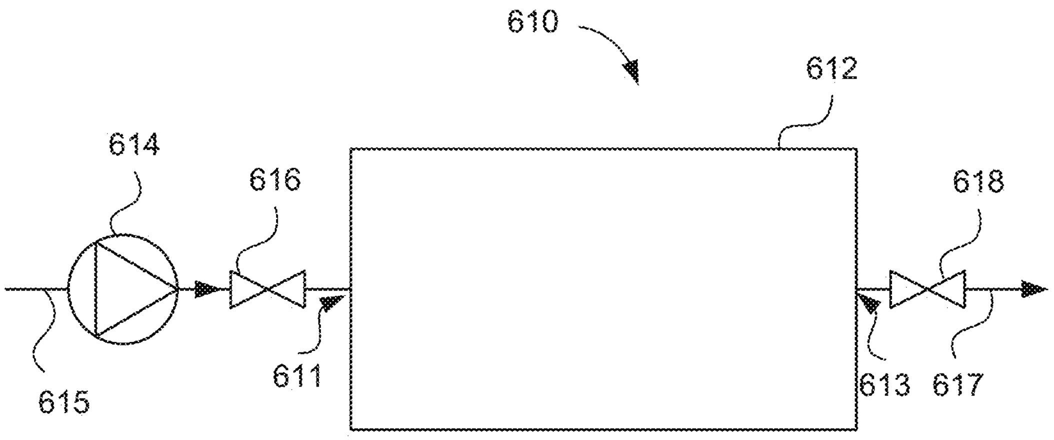
FIG. 6B is a schematic diagram of another example system, according to some embodiments.

FIG. 6B is a schematic diagram of an alternative system 610 that may be used to implement embodiments of the methods 100 and 300 disclosed herein.

The system 610 comprises a vessel 612 and a pump 614. The vessel 612 is a suitable size and shape to receive a substrate to be coated. In some embodiments, the vessel 612 is a heat exchanger itself and the substrate may be one or more plates and/or tubes within the heat exchanger.

The vessel 612 may have an inlet 611 and an outlet 613. The inlet 611 may be fluidly connected to an inlet fluid line 615 and the outlet 613 may be fluidly connected to an outlet fluid line 617. In some embodiments, the inlet fluid line 615 and outlet fluid line 617 are connected to one another such that the system 610 acts as a flow loop.

The vessel 612 is in fluid communication with the pump 614. The term "pump" in this context is intended to be inclusive of any device that moves fluids, including but not limited to pumps, aspirators, etc. In this embodiment, the pump 614 is upstream of the vessel 612 and is fluidly connected to the vessel 612 via the inlet fluid line 615 to pump fluid therethrough. In other embodiments, the pump 614 could be downstream of the vessel 612 such that fluid is pulled through the vessel 612.

The vessel 612 may be in fluid communication with one or more containers or other fluid sources (not shown) holding one or more cleaning fluids. The cleaning fluids may comprise, for example, one or more solvents and/or water. In some embodiments, the vessel 612 is fluidly connected to the containers or other sources via the inlet line 615 and the pump 614.

The vessel 612 may also be in fluid communication with one or more containers (not shown) for holding a coating composition. In some embodiments, the container may be a mixing vessel in which the coating composition is prepared. The vessel 612 may be fluidly connected to the container via the inlet line 615 and the pump 614. In some embodiments, the inlet line 615 may be connectable to various containers, thereby allowing the user to first connect the inlet line 615 to one or more sources of cleaning fluid and then disconnect the inlet line 615 and connect it to the container holding the coating composition. In other embodiments, the inlet line 615 may be simultaneously connected to various fluid sources/containers and the type of fluid flowing through the inlet line 615 is controlled by a series of valves associated with each fluid source/container.

The vessel 612 may also be in fluid communication with a source of a heating medium such as steam (not shown). The source of steam may comprise, for example, a boiler, a steam generator, etc. In some embodiments, the vessel 612 is fluidly connected to the steam source via the inlet line 615 and the pump 614. In other embodiments, the vessel 612 may be connected to a separate steam injection mechanism. The vessel 612 may also be in fluid communication with a source of inert gas (not shown). The inert gas may comprise, for example, nitrogen. The inert gas source may comprise a compressed gas cylinder or any other suitable source. In some embodiments, the vessel 612 is fluidly connected to the inert gas source via the inlet line 615 and the pump 614. In other embodiments, the vessel 612 may be connected to a separate inert gas injection mechanism.

The system 610 may further comprise at least one valve. In this embodiment, a first valve 616 is in fluid communication with the inlet line 615 and a second valve is in fluid communication with the outlet line 617. Each of the valves 616, 618 may be installed on the fluid lines 615, 617, respectively, or may be part of the vessel 612. For example, the valves 616, 618 may be part of the inlet 611 and outlet 613 of the vessel 612, respectively.

The system 610 may function as a combined cleaning, coating, and heating apparatus. In use, the substrate may first be positioned within the vessel 612. As noted above, the vessel 612 can be the heat exchanger itself and the substrate may comprise one or more plates or tubes already positioned within the heat exchanger. The inlet valve 616 may be opened and the pump 614 may pump a cleaning fluid through the vessel 612 via the inlet 611. In some embodiments, a series of cleaning fluids (e.g. starting with one or more solvents, followed by water) may be pumped through the vessel 612 sequentially. In embodiments in which the system 610 is a flow loop, the outlet valve 618 may also be opened at this stage and the cleaning fluid(s) may be circulated through the flow loop. The cleaning fluid may then be drained from the vessel 612 and the substrate may be dried. In some embodiments, the substrate may be dried via injected of a heating medium such as steam.

The pump 614 may then be used to pump the coating composition into the vessel 612 via the inlet 611. In embodiments in which the system 610 is a flow loop, the outlet valve 618 may also be opened at this stage and the coating composition may be circulated through the flow loop. The valves 616, 618 may then be closed to soak the substrate in the coating composition. After the substrate has been soaked in the coating composition for a suitable period of time, the valves 616, 618 are opened and the pump 614 can pump the remaining coating composition out of the vessel 612 via the outlet 613. In some embodiments, an inert gas (e.g. nitrogen) is injected into the vessel 612 to purge excess coating composition from the substrate.

To cure the coating on the surface of the substrate, a heating medium such as steam may be injected into the vessel 612 at a suitable temperature for a suitable period of time. In some embodiments, the heating medium may be injected in three-step heat treatment process as discussed above. In some embodiments, the heating medium may contact the coated surface directly, such as embodiments in which steam is injected into a heat exchanger and contacts the coated surfaces of the plates/tubes therein. In other embodiments, the heating medium may indirectly heat the coated surface. For example, if the heat exchanger is a shell-and-tube heat exchanger, the coating may only be on the interior of the tubes and the heating medium may be injected into the shell around the exterior of the tubes to indirectly heat the coated surfaces. The coating and heating steps can be repeated any suitable number of times. In some embodiments, additional coating layers, such as a silicone polymer overlay layer, may be added to the surface in a similar manner.

The system 610 may thereby allow the substrate to be cleaned, coated, and heat treated in a single vessel 612. In embodiments in which the vessel 612 is a heat exchanger, the system 610 allows the surfaces of the substrate to be cleaned, coated, and heat treated in situ.

In other embodiments, the methods 100 and 300 may be implemented using any other suitable system.

Thus, embodiments of the methods and systems disclosed herein allow substrates to be coated without expensive and complex equipment and the coating procedures can be performed in situ or ex situ. The methods and systems can also be easily adapted for substrates of a wide range of shapes and sizes. In some embodiments, substrates may also be coated without any pre-treatment to the surface of the substrate, other than cleaning and/or heat treatment. The coated substrates also do not require any further surface treatments or additional coatings.

Without any limitation to the foregoing, the coatings, methods, and systems disclosed above are further described by way of the following examples.

Example 1—Heat Exchanger Plate Fouling Experiments

1.1 Heat Exchanger Plates

A total of 8 plates from a plate heat exchanger were coated with a silane coating and another 8 plates were coated with a phosphonate coating. Each plate was made of titanium and had a length of 72.5 cm, width of 14 cm and thickness of 0.05 cm. The hydrophobic contact angle of the bare plates was about 35°.

1.2 Equipment Used for Coating Procedures

For the coating procedures, two stainless steel tanks were fabricated with dimensions of 76 cm×19 cm×5 cm. Each tank could hold up to four heat exchanger plates. One tank was used for the cleaning steps and one for the coating steps.

The heat treatment steps were carried out in a split open convection oven. The oven had a heating chamber with dimensions of 80 cm×25 cm×25 cm, which was large enough to accommodate four heat exchanger plates at a time. Two slotted aluminum frames were installed to hold the four heat exchanger plates vertically for the heat treatments. A delivery system was also installed to provide gas/air flow during the heat treatments in order to remove volatile chemicals from the chamber.

1.3 Coating Procedures for Laboratory Experiments

Silane Coating Protocol

Prior to the coating procedure, all of the plates were rinsed with methanol. The following procedure was used to form the silane/siloxane coating:

~10 liters of 10 vol. % siloxane fluid (methyl hydrogen polysiloxane) solution in ethanol was prepared;

The plates were placed in the cleaning tank and immersed in methanol for 30 minutes to remove any organics or other dirt from the plate surface followed by removal of the plates from the cleaning tank and hang drying in air for 30 minutes;

The cleaned plates were placed in the coating tank and immersed in the ethanol diluted siloxane solution for at least 30 minutes;

The plates were removed from the cleaning tank and hung at the top of the bath for 10 minutes to drip the excess fluid to the cleaning tank;

The plates were placed in the convection oven and inert gas/air was introduced through the gas injection port; and The plates were heat treated in the following schedule: 80° C. for 1 hr, followed by 140° C. for 2 hrs, followed by 160° C. for 1 hr.

This protocol was repeated two additional times to increase the siloxane group grafted density. The contact angle of the coated plates was measured and the average contact angle was 104°.

Phosphonate Coating Procedure

Prior to the coating procedure, all of the plates were heat treated at 275° C. for 15 hours to create surface oxide and hydroxide groups to provide anchoring sites for the phosphonate grafting on the surface. The following procedure was used to form the phosphonate coating:

~10 liters of a 1 mM Octadecylphosphonic Acid (OPDA—$C_{18}H_{39}O_3P$, mole wt. 334.47 g) solution in anisole was prepared;

The plates were placed in the cleaning tank and immersed in methanol for 30 minutes to remove any organics or other dirt from the plate surface followed by removal of the plates from the cleaning tank and hang drying in air for 30 minutes;

The cleaned plates were placed in the coating tank and immersed in the 1 mM ODPA solution for at least 30 minutes;

The plates were removed from the cleaning tank and hung at the top of the bath for 10 minutes to drip the excess fluid to the cleaning tank;

The plates were placed in the convection oven and inert gas/air was introduced through the gas injection port;

The plates were heat treated in the following schedule: 60° C. for 1 hr followed by 120° C. for 2 hrs followed by 130° C. for 1 hr;

The oven was then turned off and the plates were cooled to room temperature; and The plates were washed using methanol to remove any unreacted ODPA.

This protocol was repeated one additional time to improve homogeneity and graft density. The contact angle of the coated plates was measured after each repetition. The average contact angle values were found to be in the range of 100°.

An additional PDMS coating was provided on the phosphonate grafted plates. The PDMS coating was formed using the following protocol:

~10 liters of a 1:50 PDMS:Hexane solution was prepared (PDMS pre-polymer to curing agent ratio was 10:1);

The plates were placed in the coating tank and immersed in the 1:50 PDMS:Hexane solution for at least 30 minutes;

The plates were then baked/dried in the oven in flowing air at 80° C. overnight (~15H);

The temperature of the oven was then raised to 120° C. and held for 2H; and

The oven was then turned off and the plates were cooled to room temperature.

The contact angle of the coated plates was then measured. The average contact angle values after application of phosphonate-PDMS coating were found to be in the range of 115°. In contrast, the hydrophobic contact angles on uncoated surface were in the range of 20°-30°, and often less than 20° at process temperature, leading to deposit fouling.

1.4 Synthetic Produced Water Preparation

Synthetic SAGD produced water samples were synthesized at lab conditions by emulsifying dilute-bitumen ("dilbit"; bitumen/heptane=4 w/w) in deionized water to produce an oil-in-water (O/W) emulsion. Emulsification was carried out by ultrasonically dispersing a given amount of dilbit to deionized water at 100% amplitude setting in a 2 L glass vessel. Ultrasonication at high amplitude caused the emulsion temperature to rise to ~60° C. but at the same time was able to produce a fine emulsion with dilute bitumen droplets of 2 to 100 μm homogenously dispersed in a water-continuous phase. The prepared oil-in-water emulsion was then carefully transferred to another 2 L glass vessel fitted with a magnetic stirrer to keep the emulsion well dispersed. The emulsion was set aside in a cool place until further use. Prior to the use in experiments, the fluid was gently remixed using an ultrasonic probe for 2 mins and subsampled for total oil content analysis. Any leftover free oil was discarded. Total oil content (dispersed) in water was reported to be 3230 ppm using infrared (IR) spectroscopy. A total of 10 L of synthetic fluid was prepared for the fouling experiments.

1.5 Heat Exchanger Assembly and Operation

A parallel plate heat exchanger was used in the experiments. The heat exchanger was configured to use a set of 8 stacked plates and experimental runs were conducted with 8 silane coated plates, 8 phosphonate coated plates, and 8 bare plates for reference. The heat exchanger exchanges heat between a hot fluid and a cold fluid. The hot fluid was the synthetic SAGD produced water (oil-in-water emulsion, 5,000 ppm) at 86° C. and the cold fluid was water at 21° C. The synthetic SAGD produced water was heated and homogenized in a 6 L mixing vessel fitted with a thermocouple. The heated synthetic SAGD produced water was circulated through the heat exchanger, flowing between the metal plates and in turn delivering heat to the cool water in circulation. The cooling side was fitted with a 20 L fluid tank with cooling coils and a chiller to return the heated cooling fluid back to the base temperature. The experimental setup measured and recorded the inlet and outlet temperatures of all streams and pressure drop across the hot fluid stream. For these experiments, the setup operated at the following test conditions:

Temperature=86° C.

Pressure=245 kPa

Flowrate=1.1 L/min

Heat Exchanger Capacity=3.5 kW

The pressure drop across the heat exchanger was calculated by the following equations:

$$\frac{\Delta P}{L} = f\frac{\rho}{2}\frac{V^2}{D} \quad \text{Eq. 1}$$

$$f = \frac{0.316\mu^{0.5}}{\rho^{0.5}V^{0.5}D^{0.5}} \quad \text{Eq. 2}$$

$$V = \frac{Q}{A} \quad \text{Eq. 3}$$

Algebraic manipulation of Eq. 1 to 3 gives a pressure drop factor of the following form:

$$\frac{\Delta P}{Q^{1.5}} = 0.108\frac{\rho^{0.5}\mu^{0.5}L}{D^{1.5}A^{0.5}} \quad \text{Eq. 4}$$

Where f is the friction factor, ρ is the fluid density ($kg/m^3$), μ is fluid viscosity (kg/ms), V is fluid velocity, D is effective plate diameter and L is the plate length (m), A is the cross-section area of a plate and Q is the volumetric flowrate of fluid across the plate ($m^3/s$).

1.6 Results and Discussion

Pressure Drop and Fouling

Figure 7:
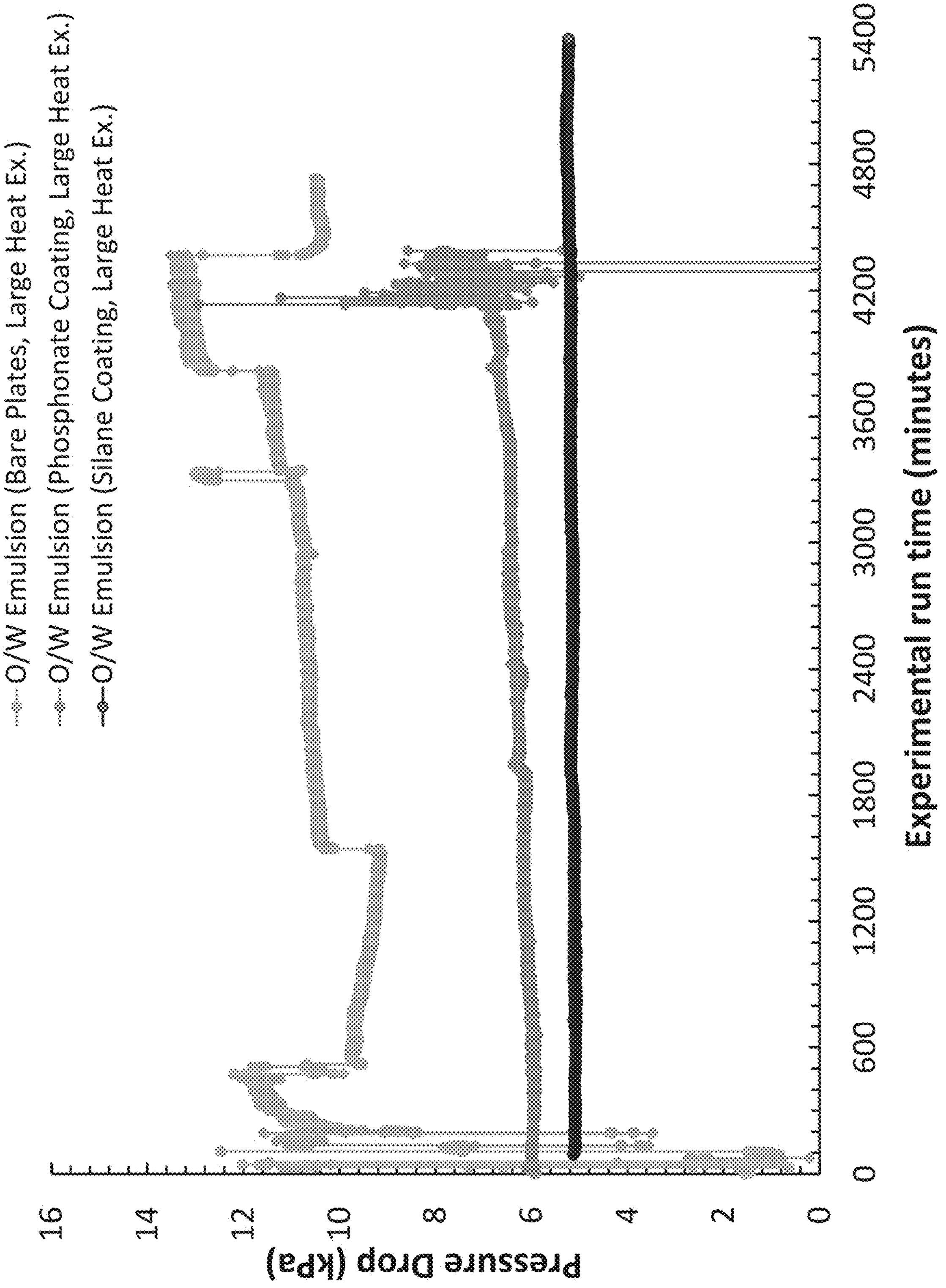
FIG. 7 is graph showing pressure drop at a given fixed flowrate of the flowing liquid as a function of time for bare (uncoated) heat exchanger plates in a parallel plate heat exchanger ("large HE") compared to phosphonate-coated and silane-coated plates.

The pressure drop results are shown in FIG. 7. The pressure drop values for the silane- and phosphonate-coated plates were compared against the values of the pressure drop for the bare plate for reference. The tests were completed after approximately 72 hours (4320 min), with the exception of the silane coated plates, which were operated for 10 days and remained relatively stable throughout the test run.

The silane coated plates showed a strong improvement in performance over the bare plates, where a pressure drop value of 5 kPa can be compared against the pressure drop value of 12 kPa for the bare, uncoated plates. It was also observed that the pressure drop values for the silane case were very stable. That is a clear indication that the heat exchanger plates have "hydrophobic" behavior that "repels" both water and oil phases, which minimizes deposits on the metal surface.

The phosphonate coated plates also showed an improvement in performance over the bare plates. The pressure drop averaged at approximately 6 kPa and was also very stable. Again, this is a clear sign of the minimization of deposits forming on the plate surface.

Visual Inspection of the Plates

Figure 8A:
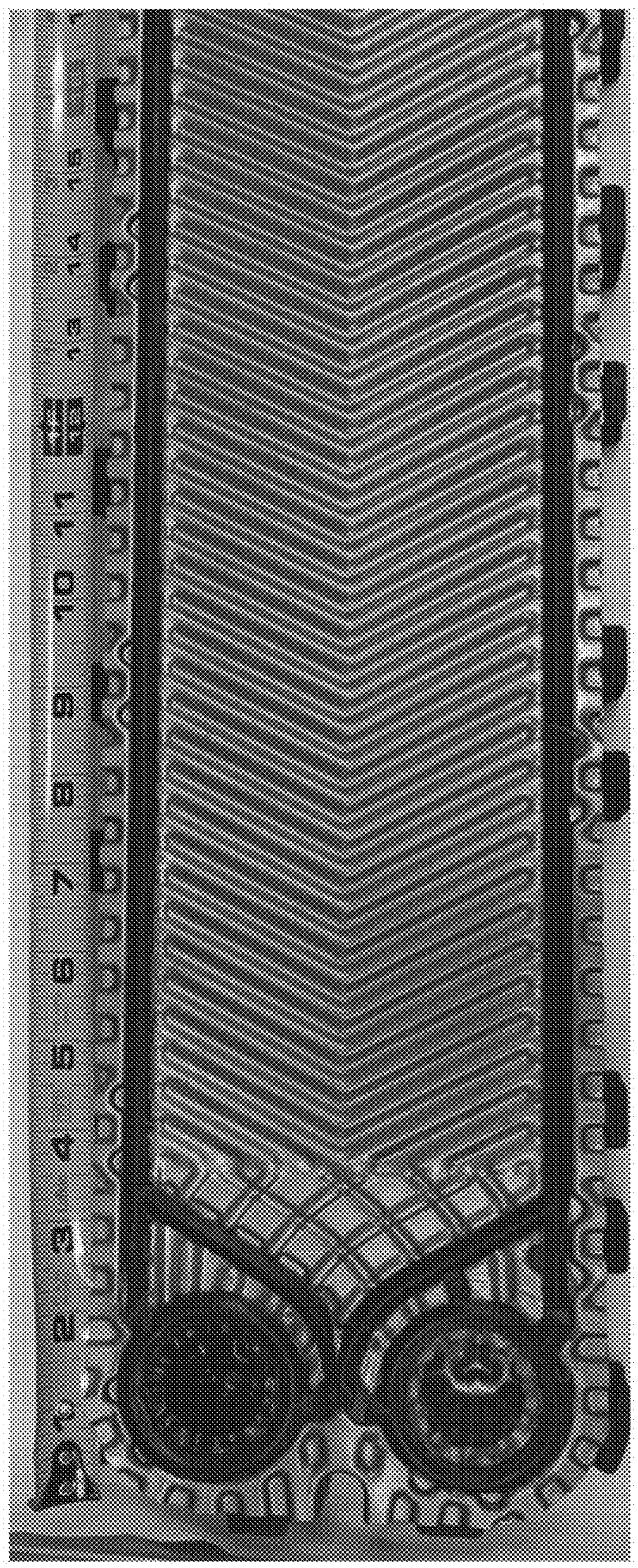
FIGS. 8A-8C are photographs of a bare (uncoated) heat exchanger plate prior to testing (FIG. 8A), the uncoated fouled heat exchanger plate after testing (FIG. 8B), and less-fouled silane- and phosphonate-coated plates after testing (FIG. 8C)
Figure 8B:
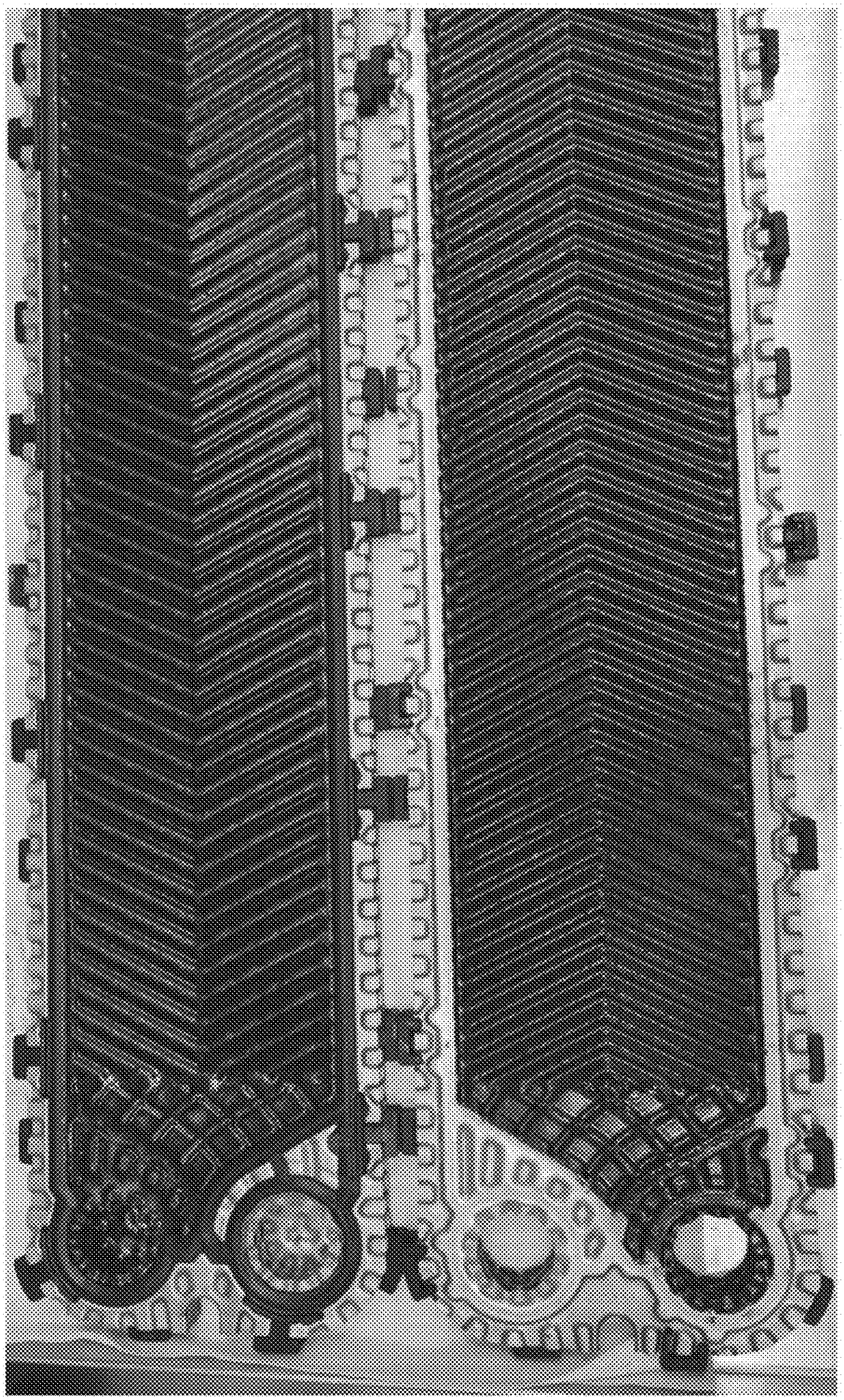

The plate heat exchanger was dismantled and plates were retrieved for inspection after the different tests to verify the conditions of the plates. FIG. 8A shows a bare (uncoated) plate prior to testing. FIG. 8B shows a bare (uncoated) plate after testing, with deposition of materials from the O/W emulsion on the surface. A significant amount of hydrocarbon was observed on the uncoated plates, covering the surface in a very homogeneous manner. The wettability of the titanium surface of the plates provided an affinity for the bitumen of the O/W emulsion, thereby leading to substantial deposition. This deposition was responsible for the high pressure drop after just few hours of operation.

Figure 8C:
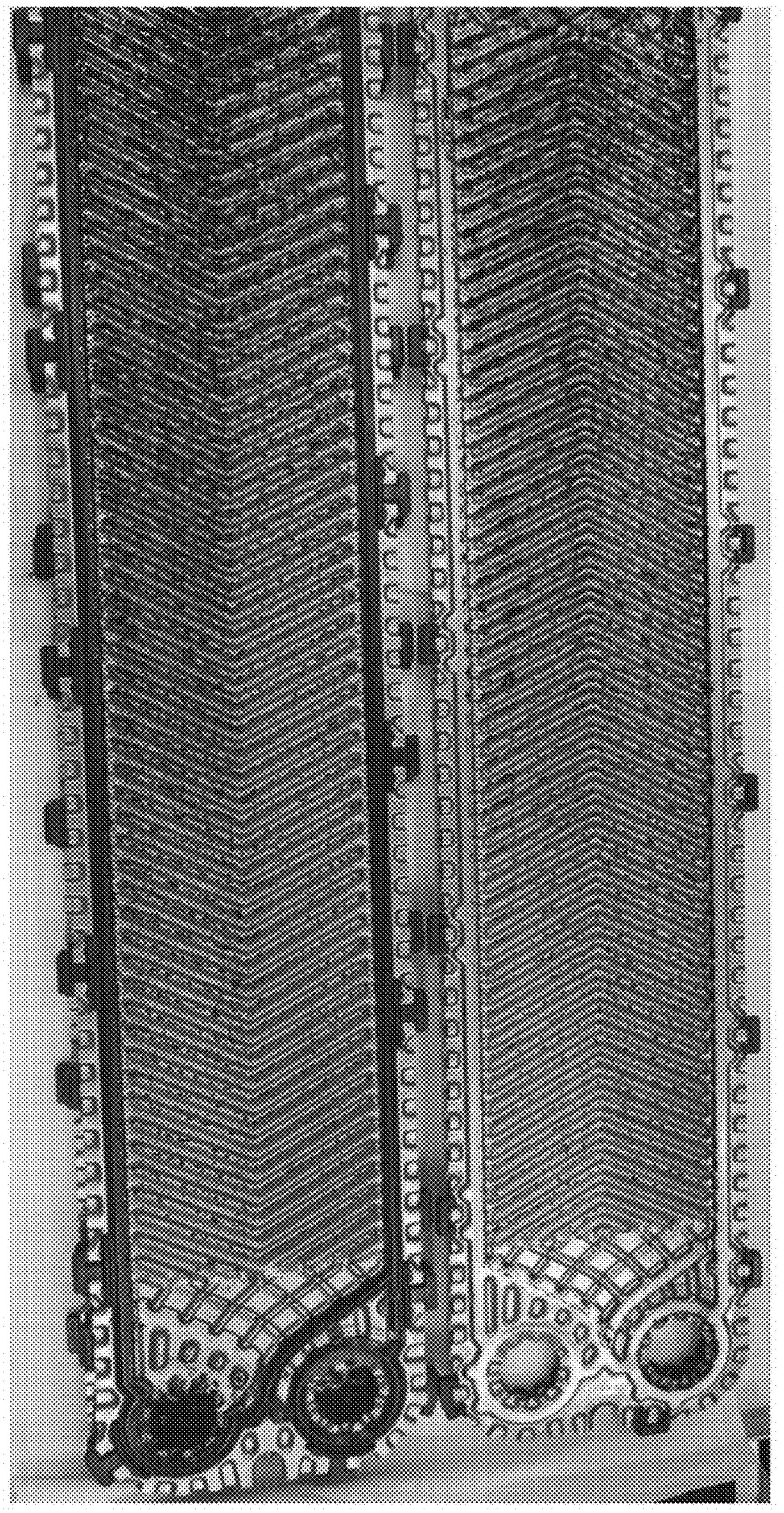

FIG. 8C shows a phosphonate-coated plate (top) and a silane-coated plate (bottom) after testing. Both coated plates presented a minimum amount of organic deposit, even for the silane plates that were operated for 10 days. This is a clear indication of how the surface wettability is modified by the coatings such that the hydrocarbon dispersed in the O/W emulsion is not attaching to the plates and producing fouling.

Total Oil Content of the O/W Emulsion

Figure 9:
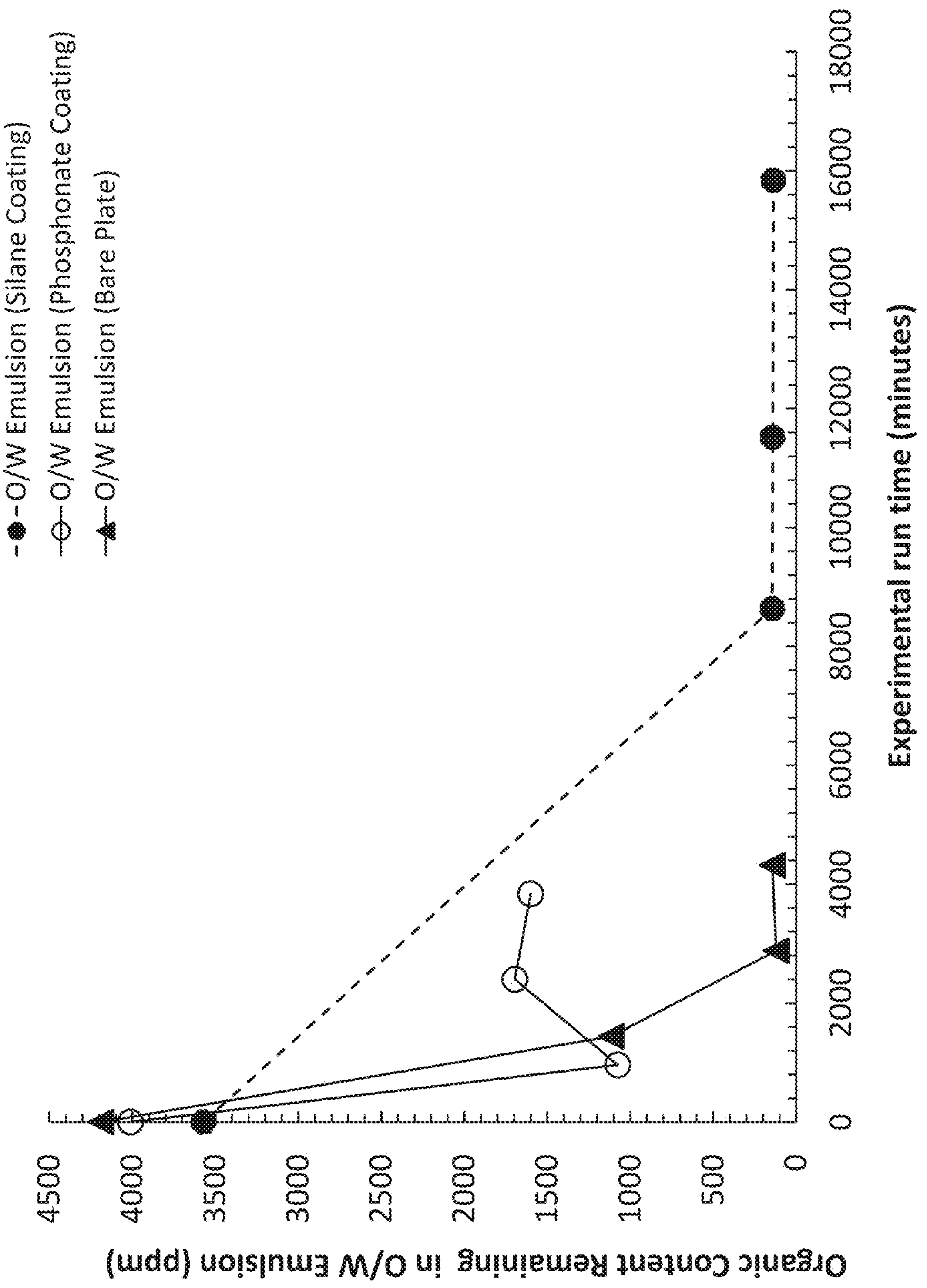
FIG. 9 is a graph showing oil content remaining in synthetic SAGD water (O/W emulsion) as a function of time for bare (uncoated) heat exchanger plates compared to phosphonate-coated and silane-coated plates.

Since the O/W emulsion is recirculated within the experimental setup, the oil content of the O/W emulsion was measured over time. The results are shown in FIG. 9. For the bare plate test, a major decrease in oil content was observed over time due to deposits forming on the bare (uncoated) plates as well as within the circuit of the pipes, connections, valves, tank, etc. For the coated plate tests, the decrease in oil content was less dramatic, due to the minimal deposition on the plates themselves. For the silane coated plates, the amount of oil dispersed in the water phase decreases linearly with time. For the phosphonate coated plates, the decrease is more erratic, initially decreasing faster than the bare plates but then stabilizing at a level above the bare plates.

Contact Angle Variations

Figure 10:
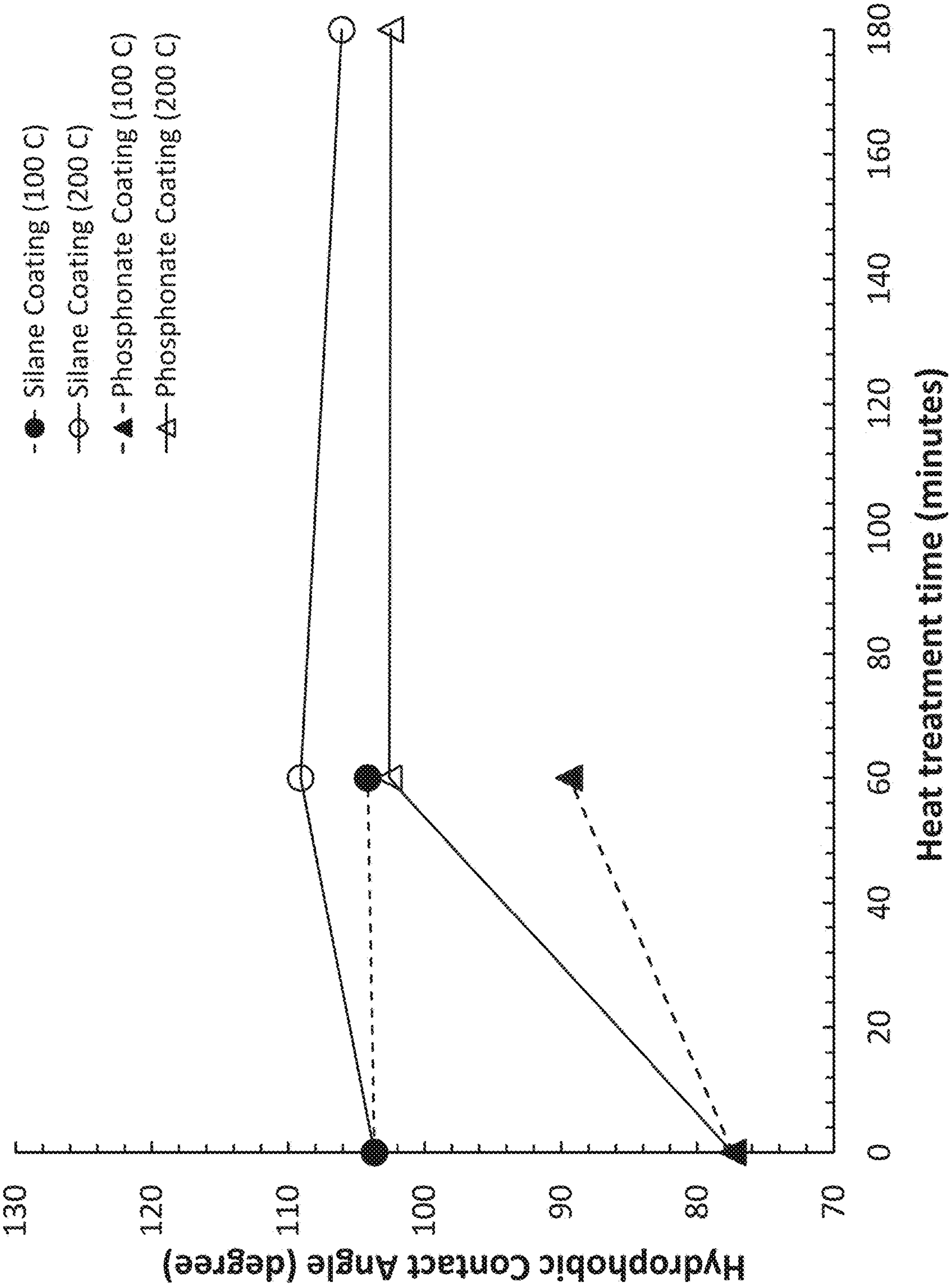
FIG. 10 is a graph showing hydrophobic contact angle in the "center of the plate" over thermal shock treatment time at 100° C. and 200° C. for silane-coated plates and phosphonate-coated plates.
Figure 11:
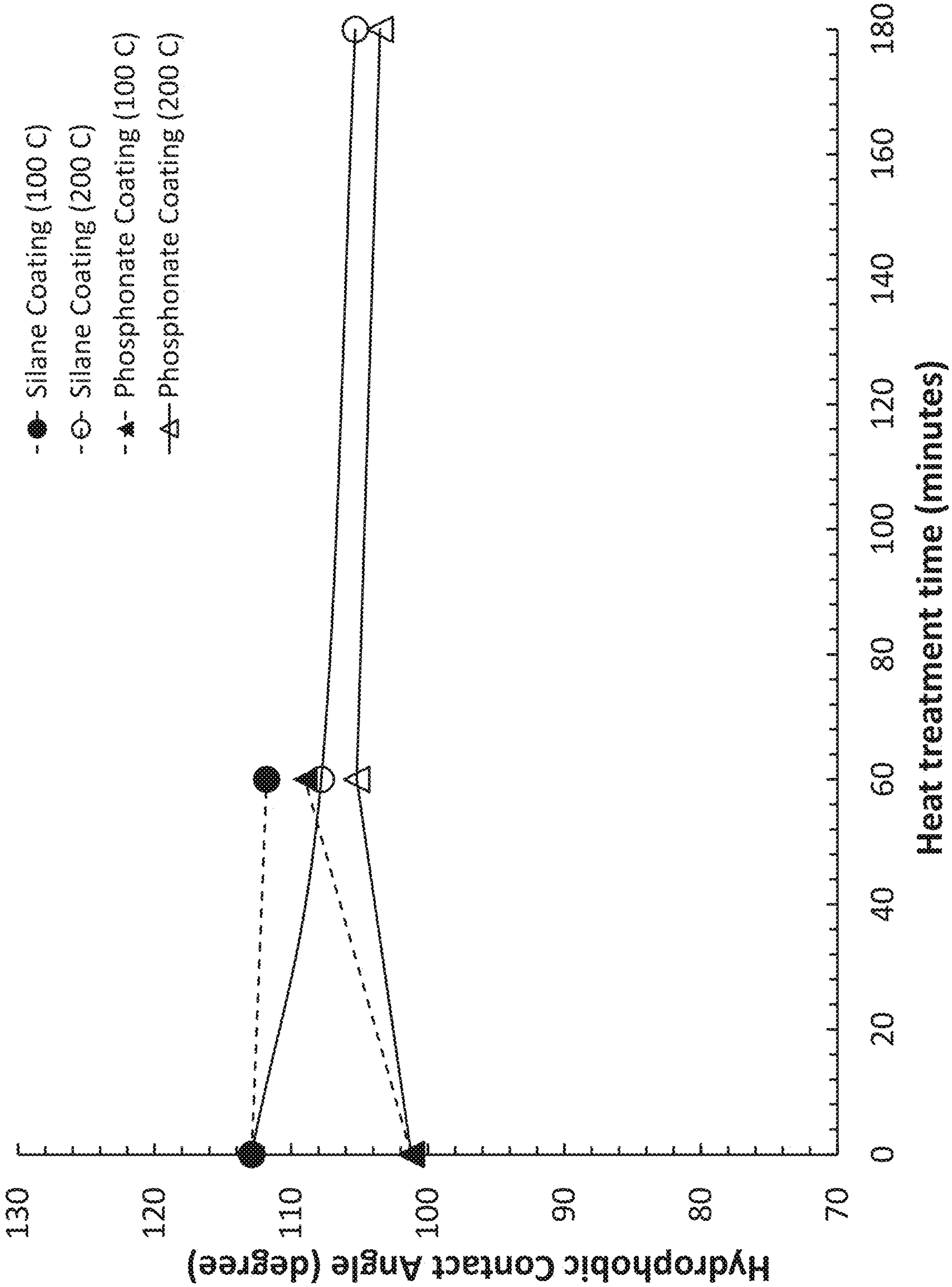
FIG. 11 is a graph showing hydrophobic contact angle at the "edge of the plate" over thermal shock treatment time at 100° C. and 200° C. for silane-coated plates and phosphonate-coated plates.

The contact angles of the coated plates were evaluated at 100° C. and 200° C. to determine if the coatings would suffer from any kind of deterioration. 200° C. is a common operating temperature in production facilities and refineries. The results of these tests are shown in FIGS. 10 and 11. The contact angle measurement were completed in the center of the plates (FIG. 10) and at the edges (FIG. 11).

No significant variation in contact angle was observed. Even after 180 minutes at 100° C. and 200° C., no significant changes to the plates were observed at either the center of the plates or the edges. These results indicate that the coatings are stable and remain without alterations up to 200° C. for at least 3 hours.

Overall Conclusions

From this investigation, it is evident that the uncoated heat exchanger plates fouled significantly due to organic components present in the water phase of the oil-in-water emulsion. Fouled uncoated plates generated a high pressure drop (12 kPa) across the plates. However, both phosphonate and silane coatings were able to deter plate fouling, resulting in a much lower pressure drop across the plates. The pressure drop was 6 kPa for the phosphonate coating and 5 kPa for the silane coating. Coated plates were also tested for thermal stability by subjecting them to temperature up to 200° C. for 3 hours. This thermal shock test had little effect on the coating materials and their adherence to plates. Treated plates were able to maintain high contact angles at high temperature, and in some cases, the contact angles even seemed to improve with thermal treatment. At the end of 3-hour tests at 200° C., hydrophobic contact angles were as high as 100° to 120° were reported. Furthermore, oil content levels consistently dropped in the water phase of the oil-in-water emulsion during the test run period in all cases. However, the oil content drop was most significant in the case of uncoated plates when compared to silane- and phosphonate-coated plates. This indicated that more oil remained dispersed in the water phase in the presence of coated plates (i.e. less oil was lost to plate fouling).

Example 2—Commercial Heat Exchanger Experiment

The silane coating technology was applied to a commercial shell-and-tube heat exchanger using the following modified procedure. In these procedures, the heat exchanger plates were coated and heat treated in situ in the heat exchanger itself.

1. Prepare coating solution by dissolving 10% to 70% vol/vol methyl hydrogen polysiloxane solution (Shin-Etsu Chemical, Japan) in ethanol.
2. Clean heat exchanger surface prior to surface treatment (mechanical and solvent treatment) and dry with an inert gas (e.g. nitrogen, etc.).
3. Inject treatment solution through the heat exchanger and soak for several hours.
4. Open the valves and drain excess coating solution out of the heat exchanger.
5. Inject a drying gas (e.g. nitrogen etc.) through the heat exchanger to remove excess treatment solution.
6. Inject steam on shell-side in temperature range of 100° to 180° C. for several hours to dry and cure the coating on the tube side as described below:
   Inject steam at 100° C. and heat treat the plates for an hour.
   Inject steam at 140° C. and heat treat the plates for two hours.
   Inject steam at 160° C. and heat treat the plates for an hour.
7. Repeat steps 3 through 6 several times to obtain complete coverage of the heat exchanger surface with coating material.
8. Collect and safely store the used, drained solution for potential later use.

The following performance indicators (PI) were used to interpret the anti-fouling performance and effectiveness of the coating: the pressure drop (kPa) over time across the heat exchanger; the elapsed time for the pressure drop to increase by 50 to 100 kPa (days); the elapsed time for the pressure drop to increase by 100 to 200 kPa (days); and the slope of pressure drop versus time (kPa per time). These performance indicators were recorded and monitored over a period of several months in order to characterize performance of the surface coating. The coated heat exchanger surfaces showed an improvement in all four performance indicators. When compared to an uncoated heat exchanger, the historical initial starting pressure drop value was lower for coated heat exchanger tubes (about 15% lower) and the coated surfaces could be operated for a longer time duration (about 26% longer).

Example 3—Modified Heat Exchanger Coating Procedures

For industrial applications, the experimental coating procedures discussed above were adapted and modified. Two example procedures are described below, one for each formulation. In these procedures, the heat exchanger plates are coated and heat treated in situ in the heat exchanger itself.

Modified Silane Coating Procedure with Steam Treatment

For the silane coating, the following modified procedure was developed:

1. Pre-clean the heat exchanger plates with a solvent such as methanol, ethanol, isopropyl alcohol, Varsol, or a combination of two or more solvents. Repeat with the same or a different solvent.
2. Pre-clean the heat exchanger plates with pure water.
3. Inject steam at 120° C. for 20 minutes to dry the plates completely. Steam flowrates are determined by heat exchanger volume.
4. Prepare a 10% vol/vol methyl hydrogen polysiloxane solution (Shin-Etsu Chemical™, Japan) in ethanol by mixing two liquids for an hour in a mixing vessel (2 L batch) at a stirrer speed of 500 rpm. Prepare several batches of solutions. Total solution volume determined by heat exchanger volume.
5. Circulate siloxane solution through the heat exchanger plates (in a flow loop assembly) and close the valves to soak the plates for a minimum of 30 minutes.
6. Open the valves and pump the remaining silicone solution out of the heat exchanger.
7. Inject nitrogen stream for 15 minutes through the heat exchanger to remove excess silicone oil solution from the plates. Nitrogen flowrate is determined by heat exchanger volume capacity.
8. Inject steam at 80° C. and heat treat the plates for an hour.
9. Inject steam at 140° C. and heat treat the plates for two hours.
10. Inject steam at 160° C. and heat treat the plates for an hour.
11. Repeat steps 5 through 10 twice to obtain complete coverage of the plates. Step 4 may also be repeated if additional siloxane solution is required.

Modified Phosphonate Coating Procedure with Steam Treatment

For the phosphonate coating, the following modified procedure was developed:

First ODPA Treatment

1. Pre-clean the heat exchanger plates with a solvent such as methanol, ethanol, isopropyl alcohol, Varsol, or a combination of two or more solvents. Repeat with the same or a different solvent.
2. Pre-clean the heat exchanger plates with pure water.
3. Repeat the cleaning procedure. Ensure plates are as clean as possible.
4. Inject steam at 120° C. for 20 minutes to dry the plates completely. Steam flowrates are determined by heat exchanger volume.
5. Prepare 1 mM Octadecylphosphonic acid, ODPA (Sigma-Aldrich™, USA) solution in Anisole (Sigma-Aldrich, USA) by mixing two liquids overnight at a stirrer speed of 500 rpm in a glass beaker (2 L) placed in a fume hood. Make several batches according to the heat exchanger fluid capacity.
6. Circulate ODPA solution in heat exchanger and close the valves. Soak for at least 15 minutes.
7. Open the valves and pump the remaining ODPA solution out of the heat exchanger.
8. Inject nitrogen stream for 15 minutes through the heat exchanger to remove excess ODPA solution from the plates. Nitrogen flowrate is determined by heat exchanger volume capacity.
9. Inject steam at 60° C. and heat treat the plates for an hour.
10. Inject steam at 120° C. and heat treat the plate for two hours.
11. Inject the steam at 130° C. and heat treat the plate for an hour.
12. Repeat steps 5 through 10 twice to obtain complete coverage of the plates. Step 4 may also be repeated if additional ODPA solution is required.

PDMS Treatment

1. Mix 13.1 grams of polydimethylsiloxane, PDMS (Sigma-Aldrich, USA) with 1.31 grams of curing agent (10:1 w/w) and mix 1000 mL of hexane and stir overnight at 500 rpm in a fume hood. Prepare a total of 8 liters.

2. Pump PDMS solution into heat exchanger (ODPA-treated plates) and close the valves. Soak for at least 2 hours.
3. Open the valves and pump the remaining PDMS solution out of the heat exchanger.
4. Inject nitrogen stream for 15 minutes through the heat exchanger to remove excess ODPA solution from the plates. Nitrogen flowrate determined by heat exchanger volume capacity.
5. Inject steam at 80° C. and heat treat the plates overnight (16 hours).
6. Inject steam at 120° C. and heat treat the plates for two hours.

Second ODPA Treatment

1. Pump ODPA solution (prepared in the first ODPA treatment, step 4) in the heat exchanger and close the valves. Soak for at least 15 minutes.
2. Open the valves and pump the remaining ODPA solution out of the heat exchanger.
3. Inject nitrogen stream for 15 minutes through the heat exchanger to remove excess ODPA solution from the plates. Nitrogen flowrate is determined by heat exchanger volume capacity.
4. Inject steam at 60° C. and heat treat the plates for an hour.
5. Inject steam at 120° C. and heat treat the plate for two hours.
6. Inject the steam at 130° C. and heat treat the plate for an hour.
7. Repeat steps 1 to 6 twice to obtain complete coverage of the plates.

It will be understood that the coating procedures provided above are examples only and embodiments are not limited to the specific order of steps, conditions, or materials in the example procedures.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A method for forming a coating on a surface of a substrate, comprising:

cleaning the surface of the substrate;

providing a coating composition comprising at least one surface modifying compound, the at least one surface modifying compound comprising an alkyl silane, a siloxane, an alkyl-phosphonic acid, or a combination thereof, contacting the surface of the substrate with the coating composition such that at least a portion of the surface modifying compound is grafted to the surface to form a coated surface;

heat treating the coated surface at a first temperature for a first time period;

heat treating the coated surface at a second temperature for a second time period, the second temperature being higher than the first temperature;

heat treating the coated surface at a third temperature for a third time period, the third temperature being higher than the second temperature; and repeating the contacting and heat treating steps at least one additional time.

2. The method of claim 1, wherein the surface modifying compound comprises the siloxane and wherein the siloxane has formula (I):

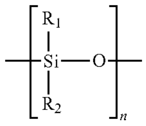

wherein $R_1$ is an alkyl group, $R_2$ is hydrogen (—H), hydroxyl (—OH), an alkoxy group (O-alkyl), or another reactive group, and n is the degree of polymerization; and wherein $R_1$ is optionally partially or fully fluorinated or partially or fully hydrogenated.

3. The method of claim 1, wherein the surface modifying compound comprises the alkyl-phosphonic acid and wherein the alkyl-phosphonic acid has formula (III):

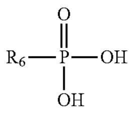

wherein $R_6$ is an alkyl group; and wherein $R_6$ is optionally partially or fully fluorinated or partially or fully hydrogenated.

4. The method of claim 1, wherein the surface modifying compound comprises the alkyl silane and the alkyl silane has formula (II):

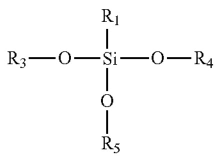

wherein $R_1$ is an alkyl group and each of $R_3$, $R_4$, and $R_5$ are independently selected from —H and an alkyl group; and wherein $R_1$ is optionally partially or fully fluorinated or partially or fully hydrogenated.

5. The method of claim 1, wherein the surface modifying compound comprises the alkyl-phosphonic acid, and wherein the method further comprises:

providing a silicone coating composition comprising a polydimethylsiloxane (PDMS) base polymer and a cross-linking compound;

contacting the coated surface with the silicone coating composition to form a silicone-coated surface; and heat treating the silicone-coated surface at between about 60° C. and about 100° C. for between about 12 hours and about 20 hours, followed by a second heat treatment at between about 100° C. and about 140° C. for 30 minutes and 4 hours.

6. The method of claim 5, wherein the PDMS base polymer has formula (VI):

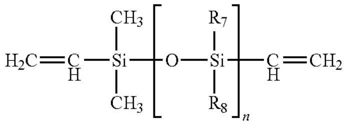

wherein $R_7$ and $R_8$ are independently selected alkyl groups and n is the degree of polymerization;

wherein the cross-linking compound has formula (VII):

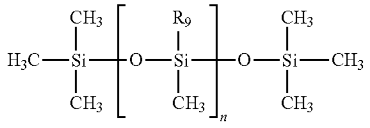

wherein $R_9$ is an alkyl group partially substituted with —H and n is the degree of polymerization; and wherein $R_7$, $R_8$, and $R_9$ are optionally partially or fully fluorinated or partially or fully hydrogenated.

7. The method of claim 5, further comprising contacting the silicone-coated surface with another coating composition comprising alkyl-phosphonic acid followed by heat treating at the first temperature for the first time period, the second temperature for the second time period, and the third temperature for the third time period.

8. The method of claim 1, wherein:

the first temperature is between about 40° C. and about 100° C. and the first time period is between about 30 minutes and 2 hours;

the second temperature is between about 100° C. and about 160° C. and the second time period is between about 1 hour and 3 hours; and the third temperature is between about 110° C. and about 180° C. and the third time period is between about 30 minutes and 2 hours.

9. The method of claim 1, wherein the substrate is at least a portion of a heat exchanger and the surface is a heat exchange surface.

10. The method of claim 9, wherein the cleaning, contacting, and heat treating steps are each performed in situ.

11. The method of claim 10, wherein at least one of the heat treating steps comprises contacting the coated surface with a heated inert gas or vapor within the heat exchanger, or passing a heated inert gas, vapor, or liquid through the heat exchanger on an opposite side of the coated surface.

12. The method of claim 1, wherein the cleaning step comprises:

contacting the surface with a first organic solvent;

contacting the surface with a second organic solvent;

contacting the surface with a diluted organic solvent in water; and contacting the surface with pure water.

13. A method for forming a coating on at least one heat exchange surface of a heat exchanger, comprising:

cleaning the heat exchange surface by passing at least one cleaning fluid through the heat exchanger;

providing a coating composition comprising at least one surface modifying compound, the at least one surface modifying compound comprising a silane, a siloxane, an alkyl-phosphonic acid, or a combination thereof;

introducing the coating composition into the heat exchanger such that the coating composition contacts the at least one heat exchange surface to form a coated surface; and heat treating the coated surface by passing a heating medium through the heat exchanger.

14. The method of claim 13, wherein the heating medium is a heated inert gas or vapor and wherein the heating medium directly contacts the coated surface.

15. The method of claim 13, wherein the heating medium is a heated liquid, gas, or vapor and wherein the heating medium indirectly heats the coated surface by passing through the opposite side of the coated surface.

16. The method of claim 13, wherein heat treating the coated surface comprises:

passing the heating medium through the heat exchanger at a first temperature for a first time period;

passing the heating medium through the heat exchanger at a second temperature for a second time period, the second temperature being higher than the first temperature; and passing the heating medium through the heat exchanger at a third temperature for a third time period, the third temperature being higher than the second temperature.

17. The method of claim 13, further comprising introducing a silicone coating composition into the heat exchanger to contact the coated surface and form a silicone-coated surface, followed by heat treating the silicone-coated surface.

* * * * *